United States Patent
Ding et al.

(10) Patent No.: US 11,151,017 B2
(45) Date of Patent: Oct. 19, 2021

(54) METHOD FOR PROCESSING REFRESH AND DISPLAY EXCEPTIONS, AND TERMINAL

(71) Applicant: Huawei Technologies Co., Ltd., Shenzhen (CN)

(72) Inventors: Chao Ding, Shanghai (CN); Zhenchao Lin, Shanghai (CN); Shun Xu, Shanghai (CN); Dong Lu, Shanghai (CN); Bin Kan, Shanghai (CN); Huihai Shen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/754,695

(22) PCT Filed: Oct. 15, 2017

(86) PCT No.: PCT/CN2017/106229
§ 371 (c)(1),
(2) Date: Apr. 8, 2020

(87) PCT Pub. No.: WO2019/071626
PCT Pub. Date: Apr. 18, 2019

(65) Prior Publication Data
US 2020/0242004 A1    Jul. 30, 2020

(30) Foreign Application Priority Data

Oct. 9, 2017 (CN) .......................... 201710931516.1

(51) Int. Cl.
*G06F 9/44* (2018.01)
*G06F 11/36* (2006.01)
*G06F 11/34* (2006.01)

(52) U.S. Cl.
CPC ...... *G06F 11/3636* (2013.01); *G06F 11/3452* (2013.01); *G06F 11/3688* (2013.01); *G06F 11/3692* (2013.01)

(58) Field of Classification Search
CPC ............ G06F 11/3636; G06F 11/3452; G06F 11/3688; G06F 11/3692
See application file for complete search history.

(56) References Cited

U.S. PATENT DOCUMENTS

2002/0135792 A1* 9/2002 Sommer ............ G06K 15/1817
358/1.13
2005/0188277 A1* 8/2005 Tayler ................. G06F 11/076
714/39

(Continued)

FOREIGN PATENT DOCUMENTS

| CN | 103412812 A | 11/2013 |
|----|-------------|---------|
| CN | 104423996 A | 3/2015 |

(Continued)

*Primary Examiner* — Hang Pan
(74) *Attorney, Agent, or Firm* — Slater Matsil, LLP

(57) ABSTRACT

A method includes: obtaining a refresh request of an application, where the refresh request is used to instruct to refresh display data of the application; transferring the refresh request to a display daemon by using a render thread of the application; when communication duration between the render thread and the display daemon is greater than a first time threshold, determining that an exception occurs in the render thread; and when duration in which the display daemon processes the refresh request is greater than a second time threshold, determining that an exception occurs in the display daemon.

20 Claims, 23 Drawing Sheets

(56) References Cited

U.S. PATENT DOCUMENTS

2006/0200450 A1* 9/2006 Keane .................. G06F 16/284
2015/0095838 A1* 4/2015 Rossi ................... G06F 3/0483
                                                    715/777
2016/0378879 A1* 12/2016 De Coninck Owe .......................
                                                    G06F 16/9574
                                                    718/102
2017/0289000 A1* 10/2017 Park ................... G06F 11/3058

FOREIGN PATENT DOCUMENTS

| | | |
|---|---|---|
| CN | 105389258 A | 3/2016 |
| CN | 106681913 A | 5/2017 |
| EP | 3056983 A1 | 8/2016 |

* cited by examiner

METHOD FOR PROCESSING REFRESH AND DISPLAY EXCEPTIONS, AND TERMINAL

CROSS-REFERENCE TO RELATED APPLICATIONS

This application is a national stage of International Application No. PCT/CN2017/106229, filed on Oct. 15, 2017, which claims priority to Chinese Patent Application No. 201710931516.1, filed on Oct. 9, 2017. Both of the aforementioned applications are hereby incorporated by reference in their entireties.

TECHNICAL FIELD

This application relates to the field of communications technologies, and specifically, to a method for processing refresh and display exceptions and a terminal.

BACKGROUND

With development of intelligent terminals, a user has an increasing use requirement on a terminal. In the terminal, a display system is a very important component of the terminal. For example, interaction between the terminal and the user in an interface needs to be implemented by using the display system.

The display system has important functions of the terminal, such as refresh, drawing, and display. When the terminal is in a display state, the display system performs a refresh operation in each refresh period. The display system includes a display daemon. A process of the refresh operation is as follows: After receiving a clock refresh signal, each application (APP) transfers a refresh request to the display daemon by using a render thread of each application, and transfers to-be-refreshed data to a graphics processing unit and a screen by using the display daemon, thereby refreshing data in a display interface. In a data refresh process, the display daemon composites layers of the applications into a display layer of a size consistent with that of the screen, transfers the display layer to the graphics processing unit of the terminal, and then updates the to-be-refreshed data to the screen.

An application crashes in the process in which the display system performs data refresh, and consequently refresh cannot be performed on the entire screen. Currently, a crash cause of the application cannot be learned of.

SUMMARY

To resolve a prior-art problem that a cause of an application exception cannot be detected, embodiments of this application provide a method for processing refresh and display exceptions and a terminal, to detect a program causing an application exception or a system exception, thereby improving efficiency of processing refresh and display, and improving fluency of screen display. The embodiments of this application further provide a corresponding computer readable storage medium and computer program product.

A first aspect of the embodiments of this application provides a method for processing refresh and display exceptions, where the method may include: obtaining a refresh request of an application, where the refresh request may be a periodic clock signal, the clock signal may be triggered by hardware such as a timer, and the refresh request is used to instruct to refresh display data of the application; transferring the refresh request to a display daemon by using a render thread of the application, where the render thread is a thread of the application, and the display daemon is a program of a display system; when communication duration between the render thread and the display daemon is greater than a first time threshold, determining that an exception occurs in the render thread, where the communication duration may be duration in which a message is transferred between the render thread and the display daemon; and when duration in which the display daemon processes the refresh request is greater than a second time threshold, determining that an exception occurs in the display daemon. The exception may include a plurality of states in which display and refresh are not fluent, for example, stalling, a crash, and blocking. It can be learned from the first aspect that a program causing an application exception or a system exception can be detected, thereby improving efficiency of processing refresh and display, and improving fluency of screen display.

Optionally, with reference to the first aspect, in a first possible implementation, the method may further include: repairing, by using a corresponding repair policy, the render thread or the display daemon when an exception occurs in either the render thread or the display daemon. It can be learned from the first possible implementation that for exceptions of different threads or programs, different repair policies are used to perform repair in a targeted manner, thereby improving efficiency of processing a refresh exception.

Optionally, with reference to the first aspect or the first possible implementation of the first aspect, in a second possible implementation, the method may further include: starting timing when the render thread transfers the refresh request to the display daemon; and determining, as the communication duration, duration from a moment at which the render thread transfers the refresh request to the display daemon to a moment at which the render thread receives a receive response returned by the display daemon, where the receive response is a response indicating that the display daemon receives the refresh request.

Optionally, with reference to the first aspect or the first possible implementation of the first aspect, in a third possible implementation, the method may further include: starting timing when the render thread transfers the refresh request to the display daemon; and if the render thread has not received a receive response when the timing exceeds the first time threshold, determining that the communication duration between the render thread and the display daemon is greater than the first time threshold, where the receive response is a response indicating that the display daemon receives the refresh request.

Optionally, with reference to any one of the first aspect or the possible implementations of the first aspect, in a fourth possible implementation, the method may further include: starting timing when the display daemon starts processing of the refresh request, and ending timing when the display daemon ends processing of the refresh request; and determining duration from a timing start moment to a timing end moment as the processing duration.

Optionally, with reference to any one of the first aspect or the possible implementations of the first aspect, in a fifth possible implementation, the method may further include: starting timing when the display daemon starts processing of the refresh request; and if the display daemon has not ended processing of the refresh request when the timing exceeds the second time threshold, determining that the duration in which the display daemon processes the refresh request is greater than the second time threshold.

Optionally, with reference to some of the foregoing embodiments of this application, in a sixth possible implementation, the repairing, by using a corresponding repair policy, the render thread or the display daemon when an exception occurs in either the render thread or the display daemon may include: when an exception occurs in the render thread, restarting the application. In this solution, if it is determined, by using the communication duration, that an exception occurs in the render thread, it may be determined that the render thread is called.

Optionally, with reference to some of the foregoing embodiments of this application, in a seventh possible implementation, the method may further include: if the render thread is not called, detecting a message queue of the application; and if it is detected that the message queue includes a refresh request that is in a wait state and that is related to display, adjusting the refresh request in the wait state in the message queue to the top of the message queue, so that the refresh request in the wait state is processed preferably. In this solution, if the render thread is not called because the message queue of a main thread is blocked, the refresh request related to display and refresh is adjusted to the top of the message queue, so that the refresh request is processed preferably, thereby quickly resolving a display exception problem.

Optionally, with reference to some of the foregoing embodiments of this application, in an eighth possible implementation, the repairing, by using a corresponding repair policy, the render thread or the display daemon when an exception occurs in either the render thread or the display daemon may include: when an exception occurs in the display daemon, restarting the display daemon.

Optionally, with reference to any one of the first aspect or the possible implementations of the first aspect of this application, in a ninth possible implementation, after the obtaining a refresh request of an application, the method may further include: responding to an entered display interface switching instruction, where the display interface switching instruction is used to instruct to switch a display interface; and if it is detected that the display interface is not switched, determining that an exception occurs in the display daemon, and restarting the display daemon.

A second aspect of the embodiments of this application provides a terminal that has a function of determining, during processing of refresh and display exceptions, a render thread or a display daemon that causes a display exception. The function may be implemented by using hardware, or may be implemented by hardware by executing corresponding software. The hardware or the software includes one or more modules corresponding to the function described in any one of the first aspect or the possible implementations of the first aspect.

A third aspect of the embodiments of this application provides a computer readable storage medium. The computer readable storage medium stores an instruction. When the instruction runs on a computer, the computer is enabled to perform the method according to any one of the first aspect or the possible implementations of the first aspect. It should be noted that the technical solutions of this application essentially, or the part contributing to the prior art, or all or some of the technical solutions may be implemented in a form of a software product. The computer software product is stored in a storage medium configured to store a computer software instruction used by the foregoing device, and the computer software product includes a program designed for a terminal to perform the first aspect.

The storage medium includes any medium that can store program code, such as a USB flash drive, a removable hard disk, a read-only memory (ROM, Read-Only Memory), a random access memory (RAM, Random Access Memory), a magnetic disk, an optical disc, or the like.

A fourth aspect of the embodiments of this application provides a computer program product including an instruction. When the computer program product runs on a computer, the computer is enabled to perform the method according to any one of the first aspect or the optional implementations of the first aspect of this application.

The technical solutions provided in the embodiments of this application have the following beneficial effects:

The terminal can detect a program causing an application exception or a system exception, thereby improving efficiency of processing refresh and display, and improving fluency of screen display.

DETAILED DESCRIPTION OF ILLUSTRATIVE EMBODIMENTS

Figure 1A:
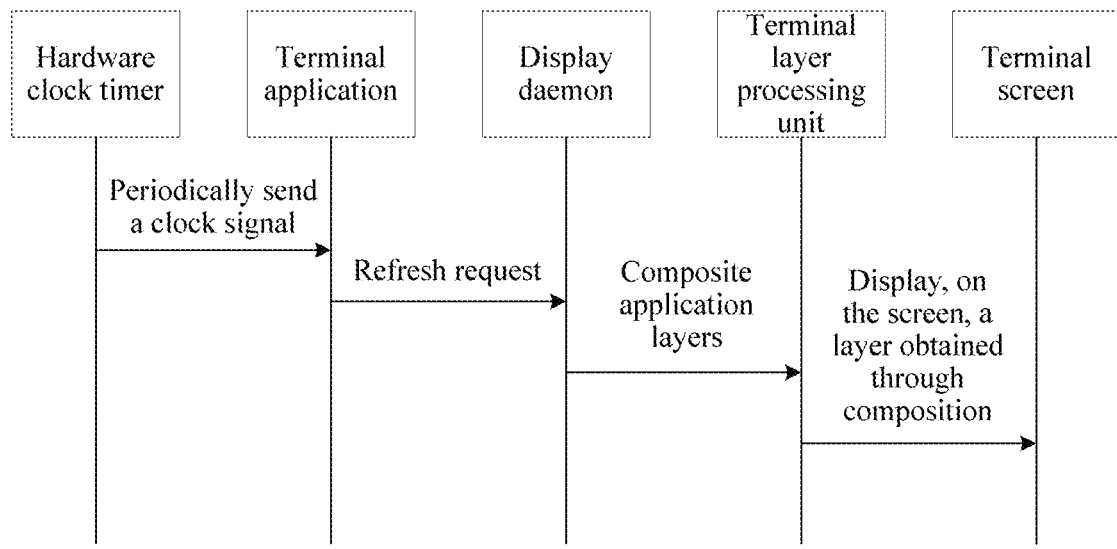
FIG. 1A is a schematic flowchart in which a terminal processes refresh and display.

FIG. 1A is a schematic flowchart in which a terminal processes refresh and display. After receiving a periodic clock signal, each application (APP) in the terminal transfers a refresh request to a display daemon by using a render thread of each application, and finally transfers to-be-refreshed data to a graphics processing unit and a screen of the terminal by using the display daemon, to complete display and refresh.

However, a current display system of the terminal lacks a monitoring and repair mechanism for the display daemon and the render thread of each application. If refresh is not fluent because display and refresh exceptions occur, for example, a crash, stalling, or blocking, refresh cannot be performed on the entire screen of the terminal, and the screen is frozen and cannot be recovered. Consequently, a user has relatively poor user experience. It may be understood that, that the screen is frozen means that the following occurs in the screen of the terminal: display stalls, refresh is not fluent, and the like.

Figure 1B:
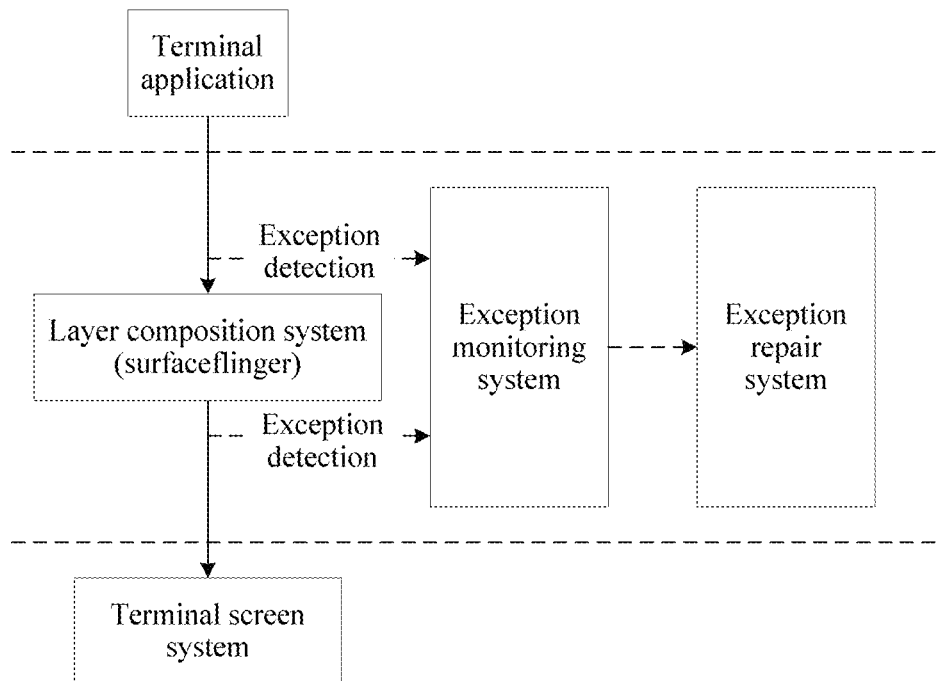
FIG. 1B is a diagram of a system architecture to which embodiments of this application are applied.

In embodiments of this application, FIG. 1B is a diagram of a system architecture to which the embodiments of this application are applied. In FIG. 1B, the terminal may include an application, a layer composition system, a terminal screen system, an exception monitoring system, and an exception repair system.

The exception monitoring system mainly monitors the render thread that performs display and refresh and the display daemon. If finding that an exception occurs in the render thread and/or the display daemon in an execution process, the exception monitoring system reports an exception message to the exception repair system. It may be understood that the exception message may include a message indicating stalling, a crash, blocking, and the like of the render thread and/or the display daemon.

The exception repair system mainly performs automatic repair based on the exception message reported by the exception monitoring system, so that an application interface can be updated.

The terminal in the embodiments of this application may be a mobile phone, a tablet computer (tablet computer), a laptop computer (Laptop Computer), a digital camera, a personal digital assistant (personal digital assistant, PDA for short), a navigation apparatus, a mobile internet device (Mobile Internet Device, MID), a wearable device (Wearable Device), a game device, or the like.

The following may further describe technical principles of the embodiments of this application.

(1) Determine whether an exception occurs in a render thread: When receiving a refresh request, a main thread of an application sends the refresh request to a render thread of the application, and then the render thread sends the refresh request to a display daemon. The refresh request may be a periodic clock signal, and the clock signal may be triggered by hardware (such as a timer). When receiving the refresh request, the display daemon may feed back a response message to the render thread. The response message indicates that the display daemon has received the refresh request sent by the render thread. The response message may be a receive response. An exception monitoring system may perform timing monitoring for communication duration between the render thread of the application and the display daemon. If the communication duration exceeds a first time threshold, the exception monitoring system determines that an exception occurs in the render thread. An exception repair system may restart the application corresponding to the render thread, to avoid screen freezing of the application.

The foregoing may be alternatively understood as follows: When the render thread sends the refresh request to the display daemon, the timer is started. When the timer reaches the first time threshold, if the render thread has not received the response message sent by the display daemon, the exception monitoring system may also consider that the communication duration exceeds the first time threshold, and may determine that an exception occurs in the render thread.

Figure 1C:
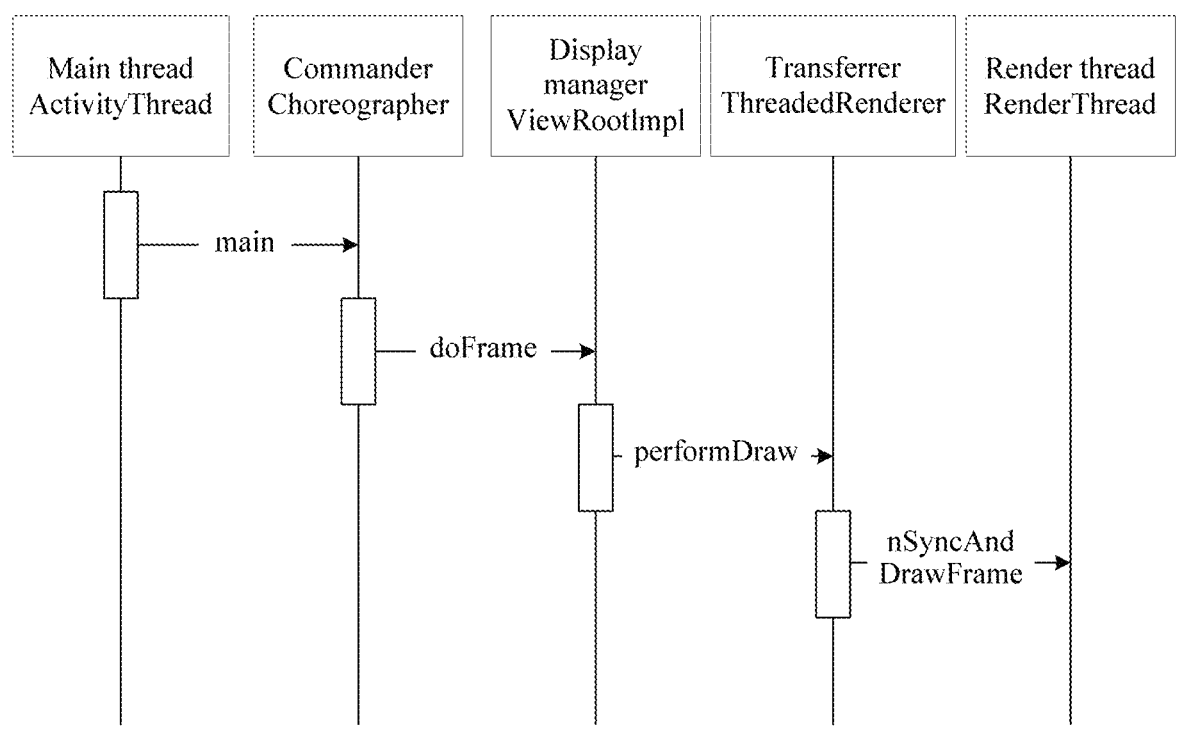
FIG. 1C is a schematic diagram of a procedure between a main thread and a render thread of an application.

Optionally, an Android (Android) platform is used as an example to describe a procedure between the main thread and the render thread of the application. FIG. 1C is a schematic diagram of a procedure between a main thread and a render thread of an application.

FIG. 1C includes the main thread (ActivityThread), a commander (Choreographer), a display manager (ViewRootImpl), a transferrer (ThreadedRenderer), and the render thread (RenderThread).

The main thread of the application receives a periodic clock signal used for display and refresh, and transfers a refresh request to the render thread by using signaling among the commander (Choreographer), the display manager (ViewRootImpl), and the transferrer (ThreadedRenderer), for example, main, doFrame, performDraw, and nSyncAndDrawFrame.

(2) Determine whether an exception occurs in the display daemon: The exception monitoring system monitors the display daemon. When the display daemon receives the refresh request sent by the render thread, the exception monitoring system may determine whether duration in which the display daemon processes the refresh request exceeds a second time threshold. If the processing duration exceeds the second time threshold, the exception monitoring system determines that an exception occurs in the display daemon, and the exception repair system may restart the display daemon, to implement overall refresh of a terminal device.

In the embodiments of this application, a process in which the display daemon processes the refresh request may be a process of performing composition processing on to-be-refreshed data based on the refresh request.

Figure 1D:
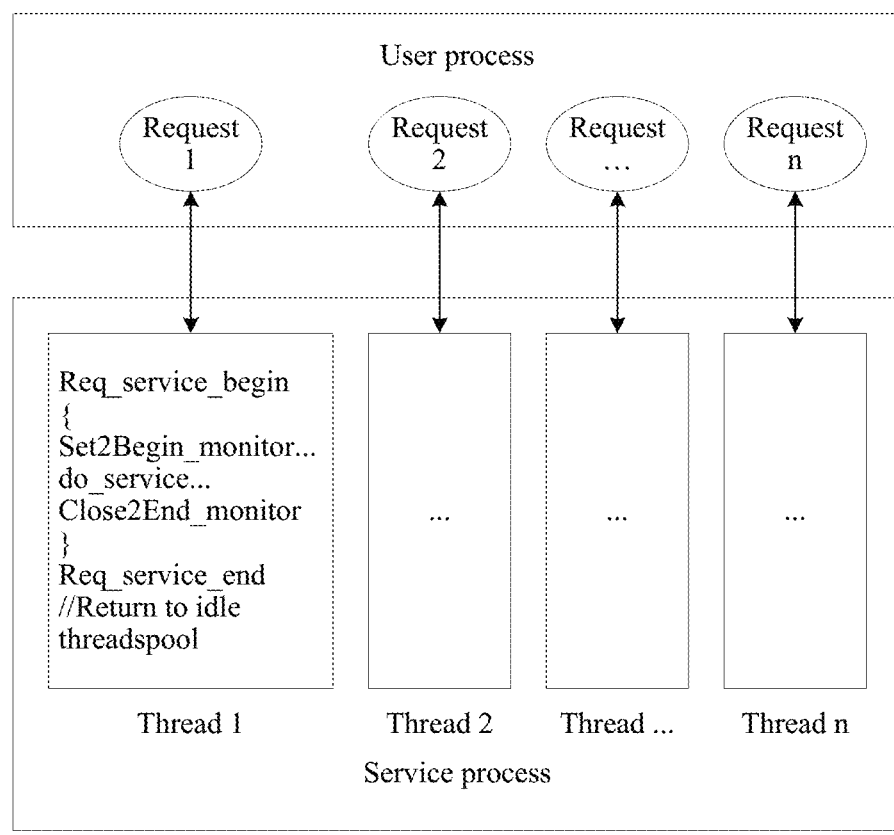
FIG. 1D is a schematic diagram of determining whether an exception occurs in a display daemon.

FIG. 1D is a schematic diagram of determining whether an exception occurs in a display daemon. As shown in FIG. 1D, the display daemon receives a plurality of requests. The plurality of requests may include a refresh request and the like. One refresh request thereof is used as an example for description. The exception monitoring system may determine, based on processing duration between a processing start time and a processing end time of the refresh request, whether an exception occurs in the display daemon.

The processing duration may be duration from a moment at which the display daemon receives the refresh request to a moment at which the display daemon completes processing of the refresh request, or may be duration from a moment at which the display daemon starts processing of the refresh request (for example, Req_service_begin in FIG. 1D) to a moment at which the display daemon completes processing of the refresh request (for example, Req_service_end in FIG. 1D). The plurality of requests may be of a same application, or may be of different applications. This is not specifically limited.

Optionally, the exception monitoring system may alternatively determine whether a quantity of to-be-processed task requests in the display daemon is greater than a specific threshold. If the quantity is greater than the specific threshold, the exception monitoring system may also determine that an exception occurs in the display daemon. The exception repair system may restart the display daemon, to implement overall refresh of the terminal device.

It should be noted that if the exception monitoring system determines that an exception occurs in the render thread and an exception occurs in the display daemon, the exception repair system may first restart the display daemon. If application display is still in an exception state after the display daemon is restarted, the application in the exception state is restarted. When an exception occurs in a plurality of applications at the same time, after the display daemon is restarted, if there are still individual applications in the exception state, these individual applications are restarted. If the exception monitoring system determines that an exception occurs in the render thread but the display daemon is normal, the exception repair system may restart the application corresponding to the render thread. If the exception monitoring system determines that the render thread is normal but an exception occurs in the display daemon, the exception repair system may restart the display daemon.

(3) A message queue of the main thread of the application includes a plurality of requests. If the plurality of requests includes a refresh request, the refresh request is adjusted to the top of the queue of the main thread, and is processed preferably, to resolve a stalling problem of the terminal. Processing logic may include the following:

a. The refresh request is identified and marked when the refresh request is inserted into the message queue of the main thread.

b. In each time of polling, whether the marked refresh request is delayed is determined first. In the embodiments of this application, if the refresh request is not at the top of the message queue, it is determined that the refresh request is delayed.

c. When the refresh request is delayed, the marked refresh request is processed preferably. A manner of preferably processing the refresh request may be adjusting the refresh request to the top of the message queue. If there are a plurality of refresh requests, the refresh requests are sequentially sorted downwards from the first location at the top in an order of entering the message queue by the refresh requests.

Figure 1E:
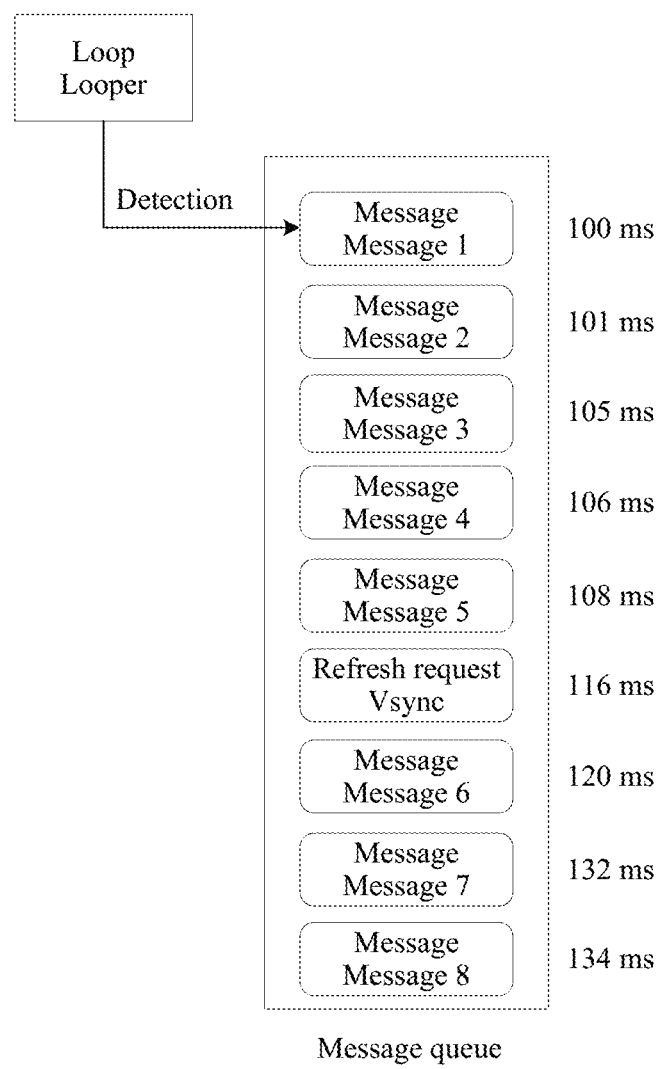
FIG. 1E is a schematic diagram in which a terminal normally processes a refresh request.
Figure 1F:
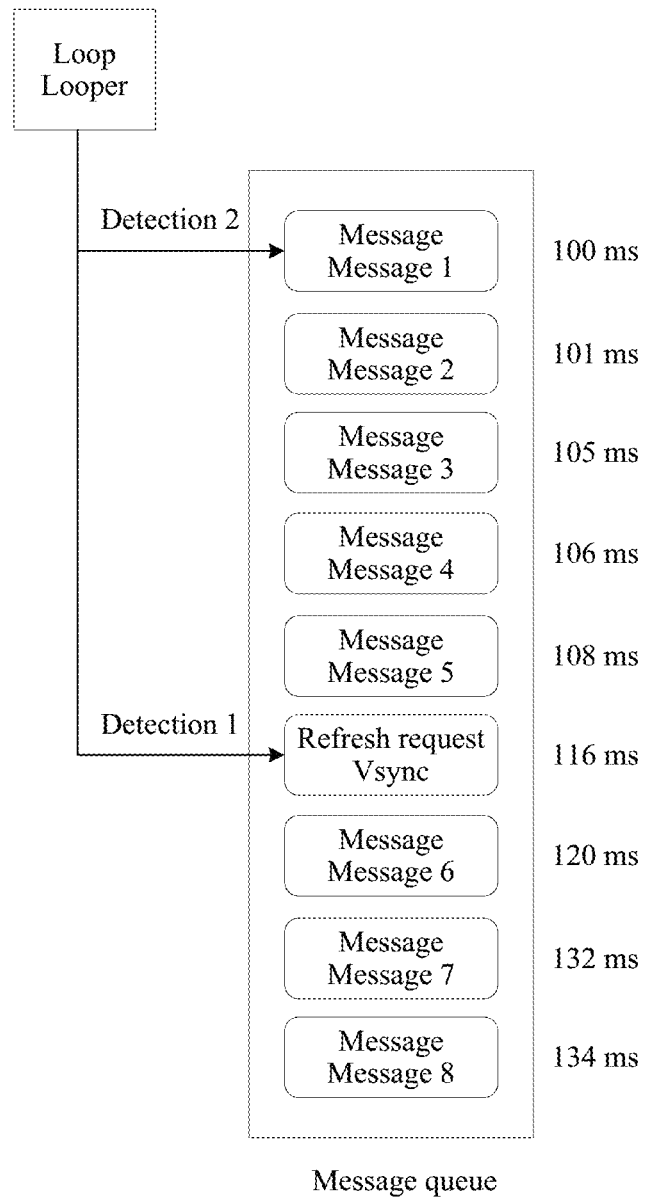
FIG. 1F is a schematic diagram in which a terminal detects a refresh request.
Figure 1G:
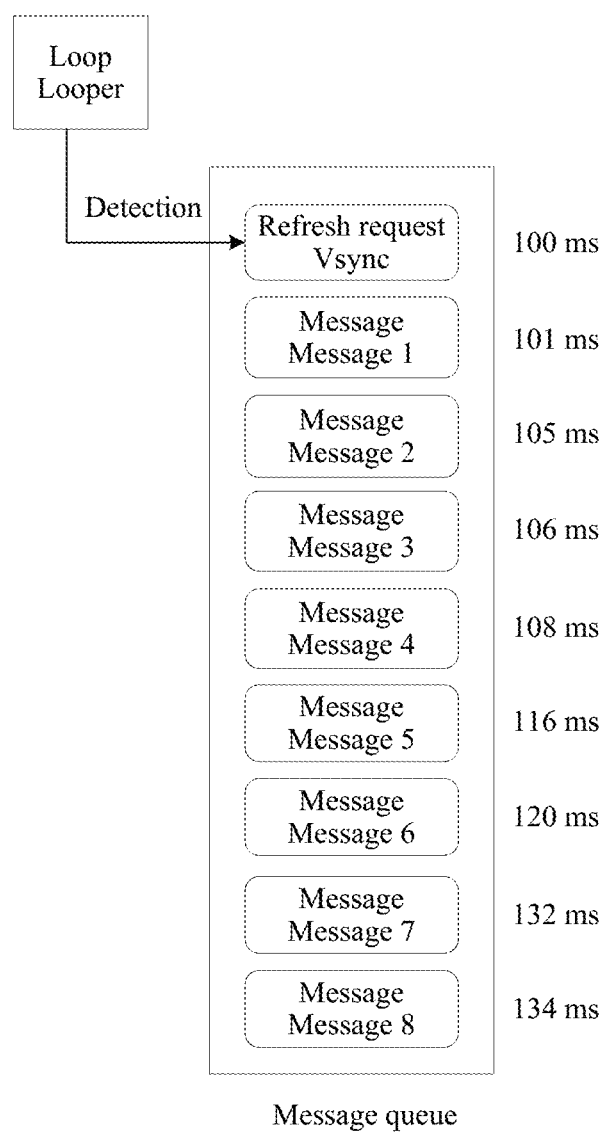
FIG. 1G is a schematic diagram in which a terminal raises a priority of a refresh request.

For example, FIG. 1E is a schematic diagram in which a terminal normally processes a refresh request. As shown in FIG. 1E, the refresh request is processed at 116 ms. FIG. 1F is a schematic diagram in which a terminal detects a refresh request. As shown in FIG. 1F, the main thread detects the marked refresh request. FIG. 1G is a schematic diagram in which a terminal raises a priority of a refresh request. As shown in FIG. 1G, the main thread adjusts the refresh request to the first location of the message queue of the main thread, and other request messages are sequentially moved downwards. In this way, the priority of the refresh request may be raised, and the main thread may preferably send the refresh request to the render thread. To be specific, the main thread of the application may process the refresh request at 100 ms. Therefore, the terminal may intelligently adjust and control a processing priority of each task of the application, to preferably ensure fluent refresh of an application interface.

Figure 2:
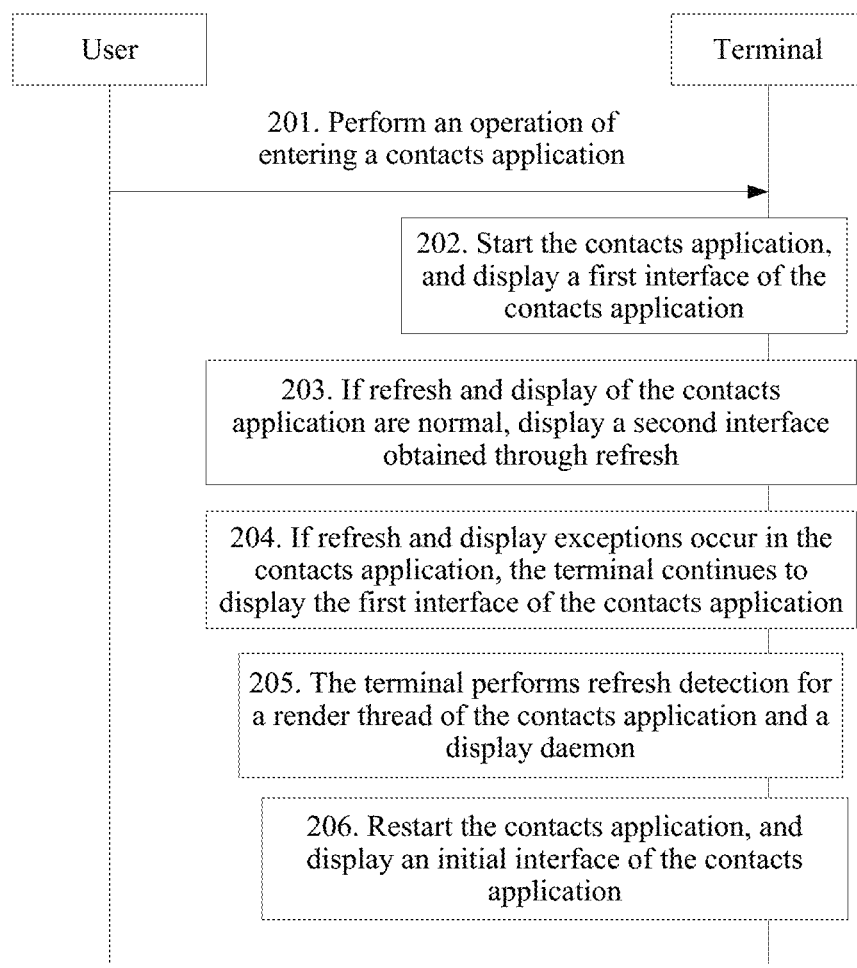
FIG. 2 is a schematic diagram of an embodiment of a method for processing refresh and display exceptions according to an embodiment of this application.

The following is described with reference to a specific embodiment. FIG. 2 is a schematic diagram of an embodiment of a method for processing refresh and display exceptions according to an embodiment of this application.

201. A user performs an operation of entering a contacts application on a terminal.

In this embodiment of this application, an example in which the terminal is a mobile phone is used for description. There are a plurality of applications in the mobile phone, including a shopping application (for example, Taobao), a communication application (for example, WeChat), and an application embedded in the mobile phone, such as an SMS message application and a contacts application. The contacts application is used as an example. When the user needs to make a call or query a phone number of a friend, the user may tap an icon of the contacts application in the mobile phone, to open the contacts application. In some feasible embodiments, the user may alternatively open the contacts application by using a voice signal, such as a mobile phone voice assistant. This is not limited herein.

202. The terminal starts the contacts application, and displays a first interface of the contacts application.

Figure 6A:
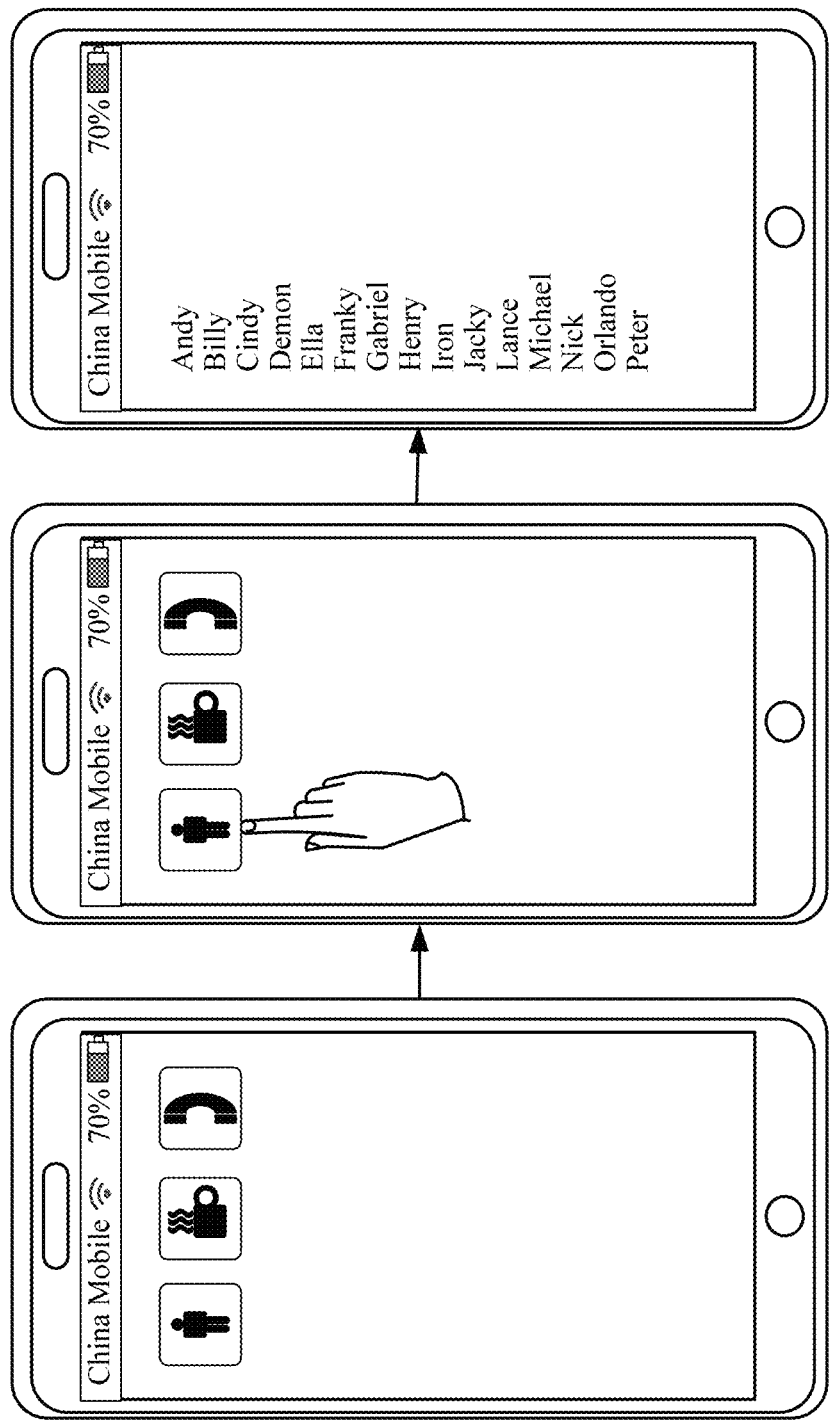
FIG. 6A is a schematic diagram in which a user taps a contacts application to display a contacts list according to an embodiment of this application.

In this embodiment of this application, when the user performs the operation of entering the contacts application on the terminal, the terminal may start the contacts application, and display the first interface of the contacts application. The first interface may be an address book interface, a recent call screen, a dial pad interface, or the like. FIG. 6A is a schematic diagram in which a user taps a contacts application to display a contacts list. When the terminal displays a desktop, the user may perform an operation of tapping the icon of the contacts application on the desktop. The terminal responds to the operation, and displays the contacts list in the contacts application.

In some feasible embodiments, the first interface may be an initial interface of the contacts application, or may be an interface from which the user exits when the user enters the contacts application previous time. This is not limited herein. It should be noted that in some feasible embodiments, content of the first interface may be phone numbers of a plurality of contacts, detailed information of a single contact, a setting interface of the contacts application, or the like. This is not limited herein.

203. If refresh and display of the contacts application are normal, the terminal displays a second interface that is of the contacts application and that is obtained through refresh.

Figure 6B:
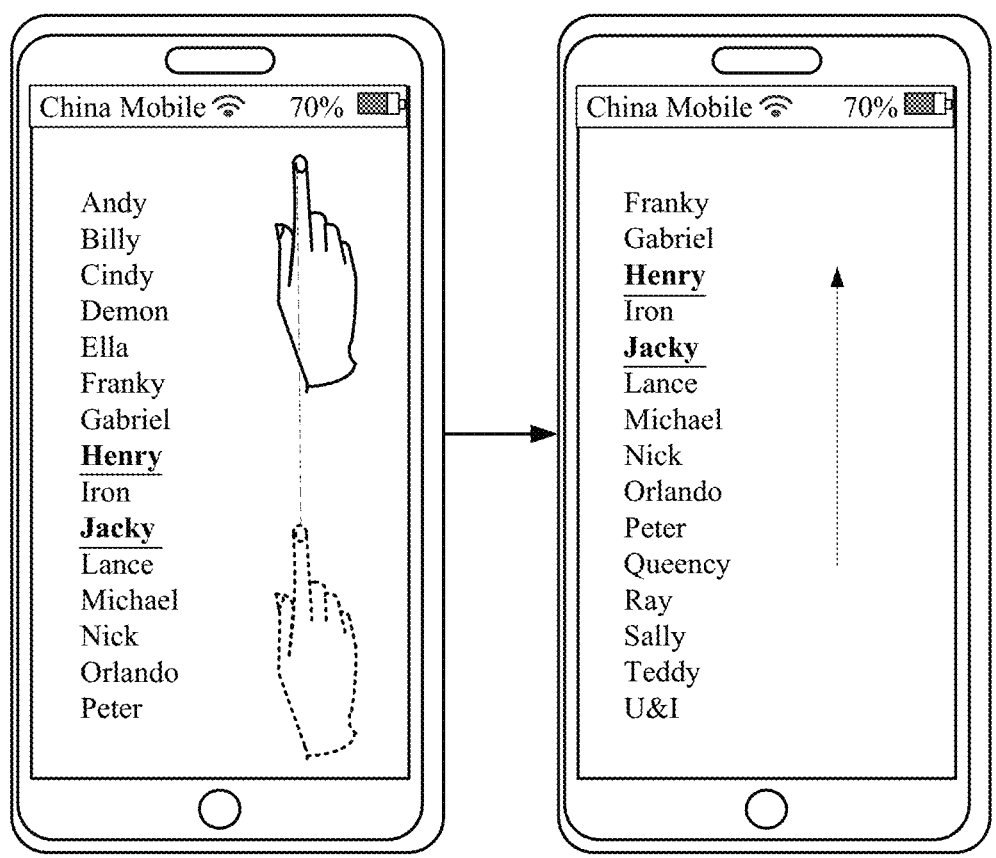
FIG. 6B is a schematic diagram in which a user performs a bottom-up sliding operation on a terminal by touching a screen according to an embodiment of this application.

In this embodiment of this application, after the contacts application is started, for example, a timer of a display system periodically generates a clock signal, namely, a refresh request. The refresh request is transferred to a render thread of the contacts application, and the refresh request is transferred by the render thread to a display daemon. Then, the display daemon composites to-be-refreshed data based on the refresh request, and the display daemon transfers the composited data to a graphics processing unit and a screen of the terminal, to implement refresh and display. For example, refresh is performed 60 times in one second, and refresh can be performed on the screen of the terminal a maximum of 60 times. In some cases, there is no difference between content obtained after refresh and original content because no operation is performed or no content is updated. In some cases, there is a difference between content obtained after refresh and original content, for example, when an operation from the user is received, such as tapping to view a contact, sliding the screen up and down, tapping a contact, or sliding contact information left and right. FIG. 6B is a schematic diagram in which a user performs a bottom-up sliding operation on a terminal by touching a screen. The user may perform the bottom-up sliding operation in the first interface of the contacts application by touching the screen. In this case, the terminal may respond to the operation, and display information about more contacts.

Figure 6C:
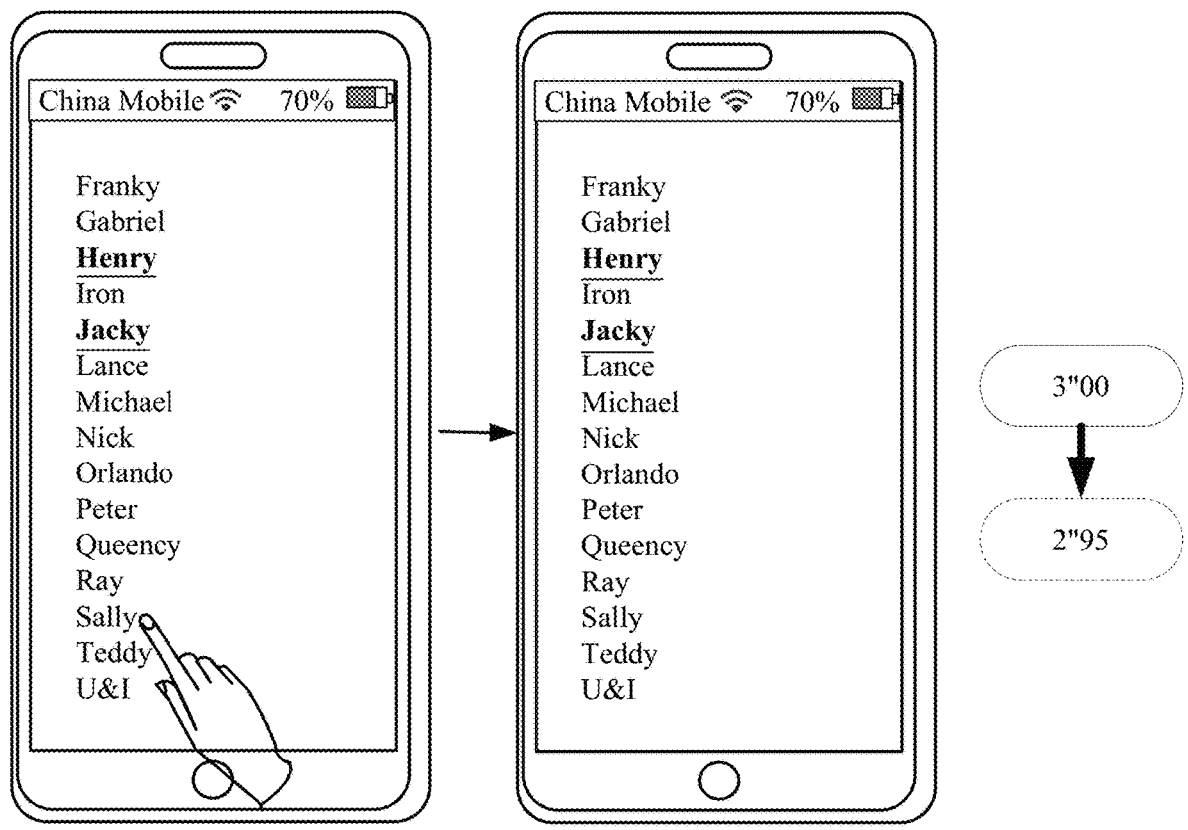
FIG. 6C is a schematic diagram in which a user performs an operation of tapping a contact in a contacts application according to an embodiment of this application.

FIG. 6C is a schematic diagram in which a user performs an operation of tapping a contact in a contacts application. When the user taps "Sally", the terminal starts a first timer. A timing length of the first timer may be set to, for example, 3 seconds. In this case, if the contacts application has not responded when the timing length of the first timer reaches 2.95 seconds, the first interface is still displayed.

Figure 6D:
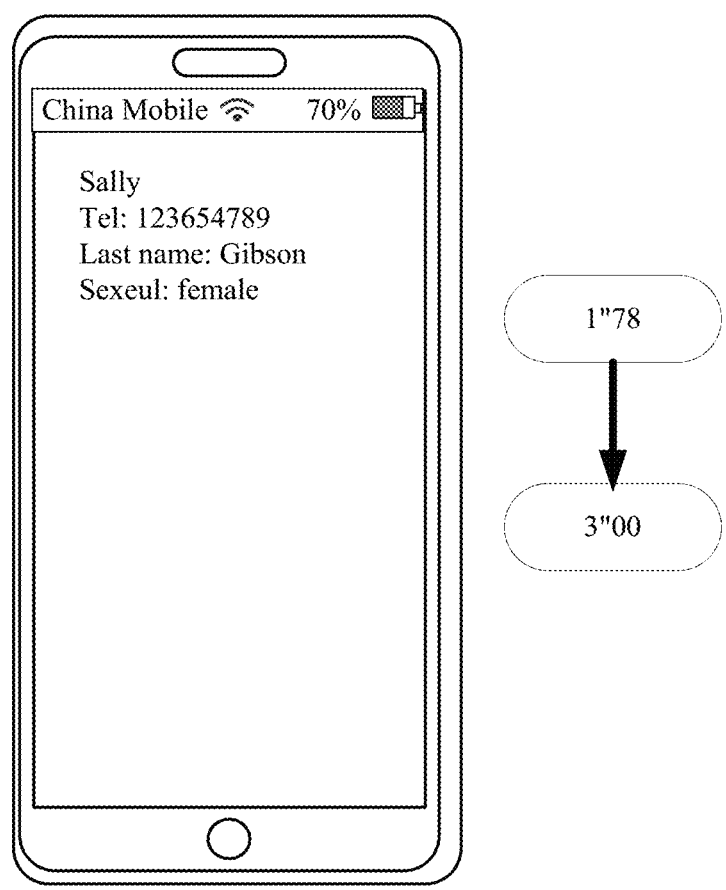
FIG. 6D is a schematic diagram in which a contacts application enters a second interface from a first interface according to an embodiment of this application.

FIG. 6D is a schematic diagram in which a contacts application enters a second interface from a first interface. If the second interface is entered and contact information of Sally is displayed when the timing length of the first timer reaches 1.78 seconds, it indicates that refresh is normal.

In some feasible embodiments, the terminal may include a plurality of different applications including the contacts application. For a refresh processing process of each application, refer to the foregoing refresh and display processing process of the contacts application for understanding.

204. If refresh and display exceptions occur in the contacts application, the terminal continues to display the first interface of the contacts application.

In some cases, after the user inputs a refresh operation on the terminal, the terminal continues to display the first interface of the contacts application. In this case, even if the user performs another operation on the terminal, the terminal does not display new interface content, but still stays in the first interface. If this case lasts a long time, it means stalling or a crash for the user.

Figure 6E:
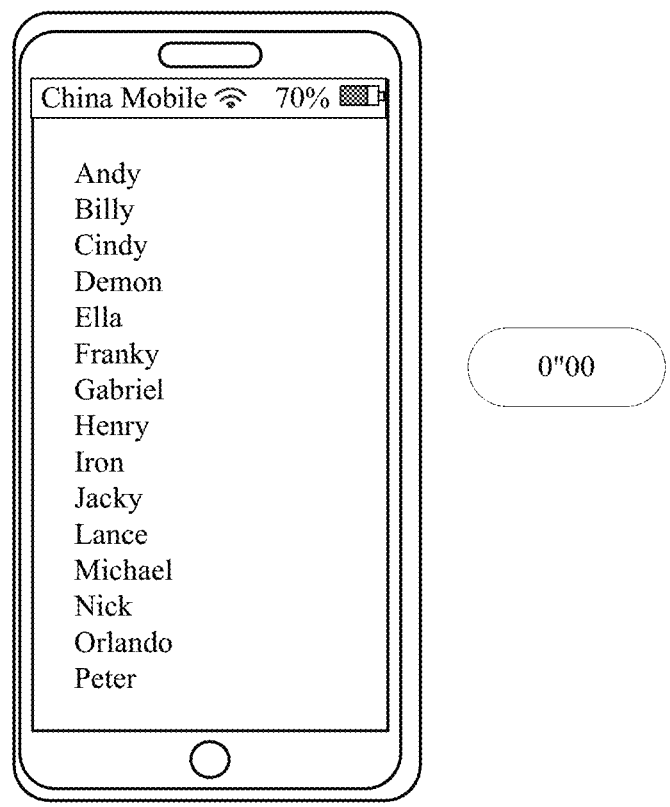
FIG. 6E is a schematic diagram in which a second interface is still not entered when a first timer ends according to an embodiment of this application.
Figure 6F:
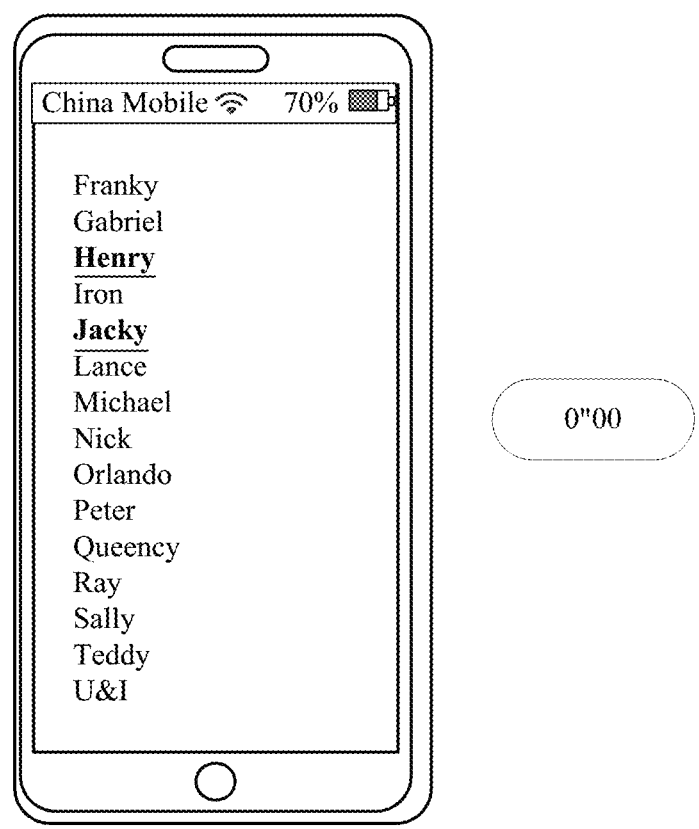
FIG. 6F is a schematic diagram in which a contacts application is still not restarted after a first time threshold is reached according to an embodiment of this application.
Figure 6G:
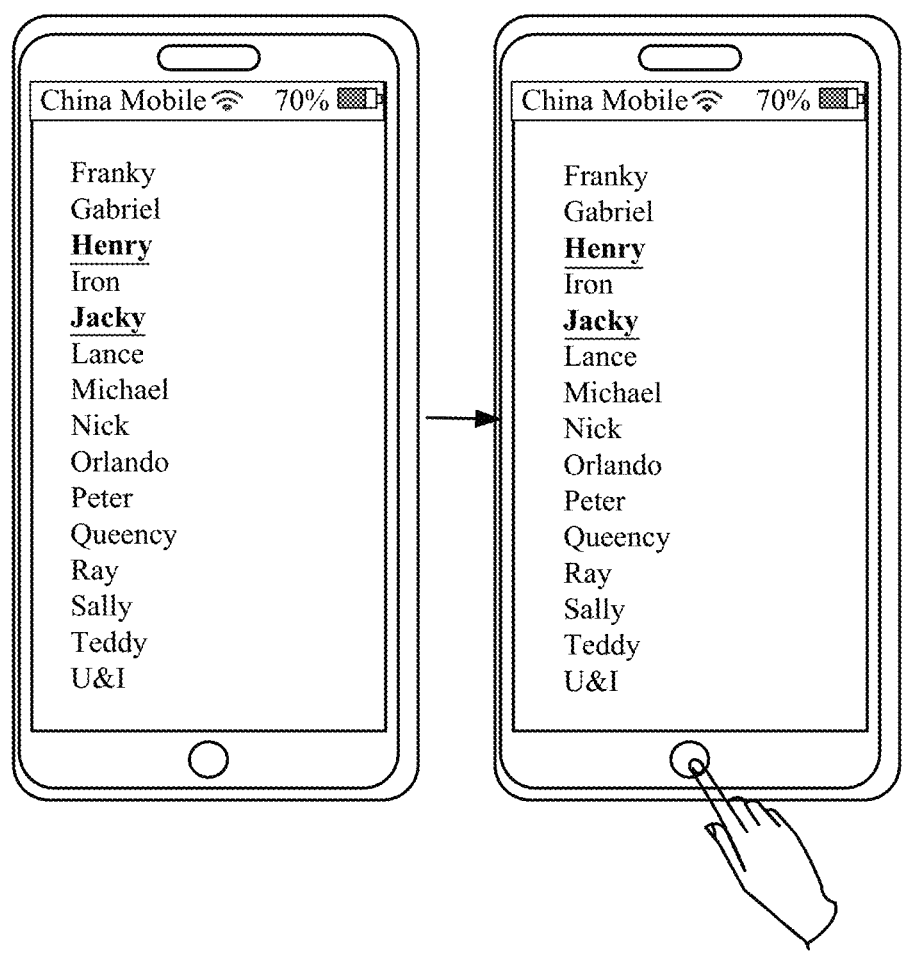
FIG. 6G is a schematic diagram in which a user taps a home button when there is an exception according to an embodiment of this application.

FIG. 6E is a schematic diagram in which a second interface is still not entered when a first timer ends. If the second interface is still not entered when the timing length of the first timer exceeds 3 seconds, the first interface is still displayed.

205. The terminal performs refresh detection for the render thread of the contacts application and the display daemon.

In some feasible embodiments, for the render thread, the terminal detects communication duration between the render thread and the display daemon. When the communication duration between the render thread and the display daemon is greater than a first time threshold, the terminal determines that an exception occurs in the render thread.

Detection of the communication duration may be as follows:

Timing is started when the render thread transfers the refresh request to the display daemon; and duration from a moment at which the render thread transfers the refresh request to the display daemon to a moment at which the render thread receives a receive response returned by the display daemon is determined as the communication duration, where the receive response is a response indicating that the display daemon receives the refresh request.

A manner of determining that the communication duration between the render thread and the display daemon is greater than the first time threshold may alternatively be as follows:

Timing is started when the render thread transfers the refresh request to the display daemon; and if the render thread has not received a receive response when the timing exceeds the first time threshold, it is determined that the communication duration between the render thread and the display daemon is greater than the first time threshold, where the receive response is a response indicating that the display daemon receives the refresh request.

Exception detection for the display daemon may be as follows: When duration in which the display daemon processes the refresh request is greater than a second time threshold, it is determined that an exception occurs in the display daemon.

A manner of determining the processing duration may be as follows:

Timing is started when the display daemon starts processing of the refresh request, and timing ends when the display daemon ends processing of the refresh request; and duration from a timing start moment to a timing end moment is determined as the processing duration.

A manner of determining that the duration in which the display daemon processes the refresh request is greater than the second time threshold may alternatively be as follows:

Timing is started when the display daemon starts processing of the refresh request; and if the display daemon has not ended processing of the refresh request when the timing exceeds the second time threshold, it is determined that the duration in which the display daemon processes the refresh request is greater than the second time threshold.

Whether an exception occurs in either the render thread or the display daemon, a corresponding repair policy may be used for repair.

In this embodiment of this application, the exception may include an exception of the contacts application, namely, an exception of the render thread, and an exception of the display daemon. If it is determined that an exception occurs in the render thread, it is determined that an exception occurs in the contacts application, and the contacts application needs to be processed. In this embodiment of this application, the terminal has an exception monitoring system and an exception repair system. The exception monitoring system is configured to determine, when an exception occurs, whether the exception is an exception of the application or an exception of the display daemon. The exception repair system is configured to repair the exception that occurs.

206. The terminal restarts the contacts application, and displays the initial interface of the contacts application.

In this embodiment of this application, if the exception monitoring system determines that the contacts application has an exception, the exception repair system restarts the contacts application, to repair the exception. It should be noted that when the contacts application is restarted, the initial interface of the contacts application is displayed. FIG.

6F is a schematic diagram of an initial interface that is of a contacts application and that is displayed after the contacts application is restarted.

In this embodiment of this application, when a contacts interface fails to be refreshed, automatic monitoring and automatic repair may be performed, so that the contacts interface is refreshed normally. To be specific, a display stalling detection algorithm and a display stalling repair algorithm may be added to the terminal, to automatically repair an application interface display exception.

Figure 3:
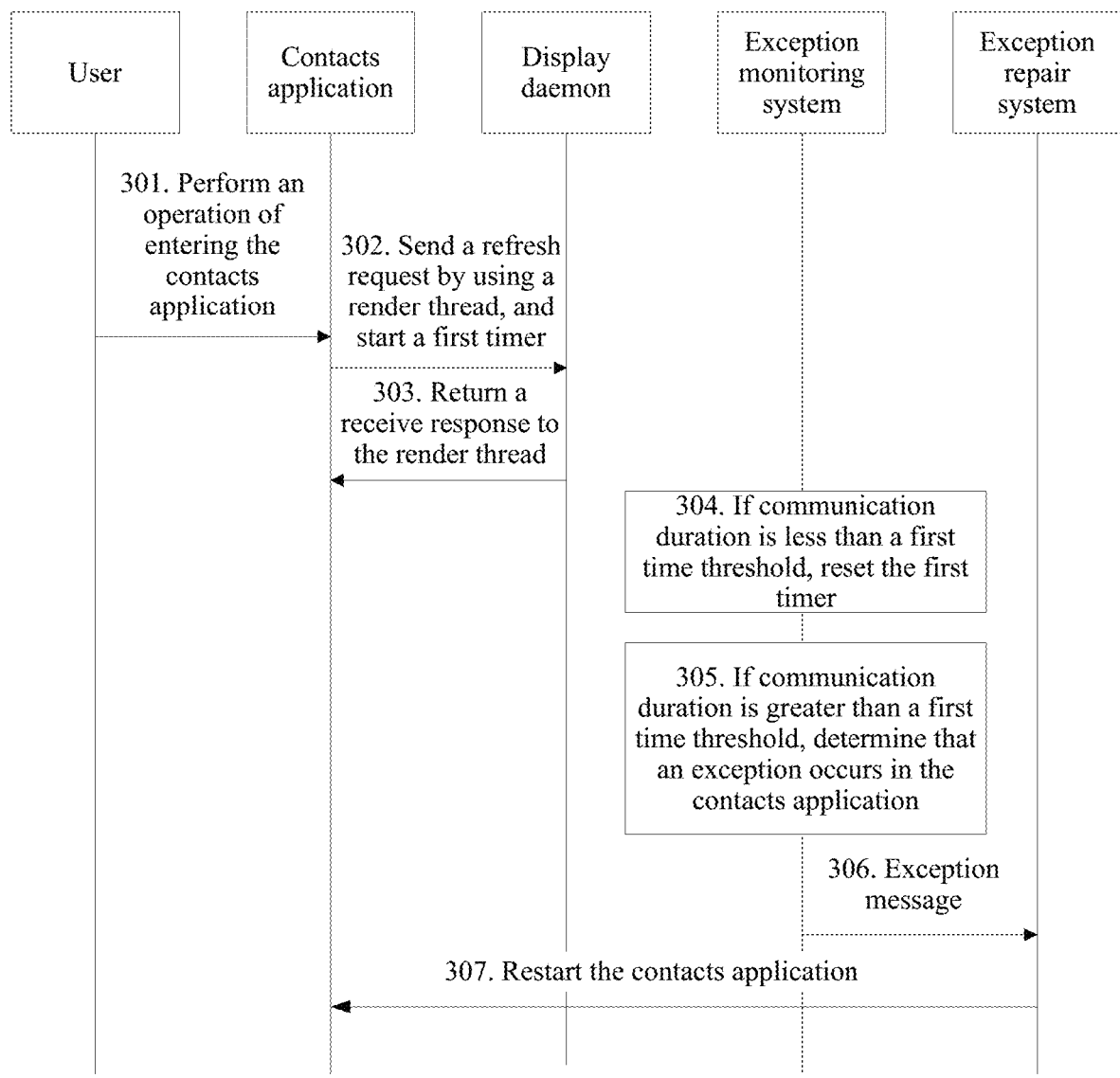
FIG. 3 is a schematic diagram of another embodiment of a method for processing refresh and display exceptions according to an embodiment of this application.

Specifically, FIG. 3 is a schematic diagram of another embodiment of a method for processing refresh and display exceptions according to an embodiment of this application. The following is described with reference to a feature of internal implementation of a terminal.

301. A user performs an operation of entering a contacts application on the terminal.

In this embodiment of this application, an example in which the terminal is a mobile phone is used for description. There are a plurality of applications in the mobile phone, including a shopping application (for example, Taobao), a communication application (for example, WeChat), and an application embedded in the mobile phone, such as an SMS message application and a contacts application. The contacts application is used as an example. When the user needs to make a call or query a phone number of a friend, the user may tap an icon of the contacts application in the mobile phone, to open the contacts application. In some feasible embodiments, the user may alternatively open the contacts application by using a voice signal, such as a mobile phone voice assistant. This is not limited herein.

In interaction between the user and the terminal in this embodiment of this application, the terminal includes at least an application (the contacts application is used as an example herein), a display module (a screen), an exception monitoring system, and an exception repair system. When the user performs the operation of entering the contacts application on the terminal, the contacts application is started, and a request for displaying an interface of the contacts application is sent to the screen.

When receiving the request for displaying the interface of the contacts application, the screen may display a first interface of the contacts application. As described above, the first interface may be an initial interface of the contacts application, or may be an interface from which the user exits when the user enters the contacts application previous time. This is not limited herein.

302. When a render thread of the contacts application sends a refresh request to a display daemon, start a first timer.

The contacts application may continuously receive refresh requests. The refresh requests are transferred by the render thread of the contacts application to the display daemon. When any refresh request is sent by the render thread to the display daemon, the first timer is started. A timing length of the first timer may be set to, for example, 3 seconds.

303. If the display daemon receives the refresh request, the display daemon returns a receive response to the render thread.

A moment at which the render thread transfers the refresh request to the display daemon to a moment at which the render thread receives the receive response returned by the display daemon is communication duration between the render thread and the display daemon.

304. If the communication duration is less than a first time threshold, the first timer may be reset.

In this embodiment of this application, if the communication duration is within the first time threshold, for example, within 3 seconds, the first timer may be reset to monitor communication duration next time.

If the timing duration of the first timer is 3 seconds, countdown is performed from 3 to 0, and monitoring logic ends, and the first timer is initialized and reset to 3 seconds. In some feasible embodiments, if a timing method of the first timer is 0, 1, 2, and 3 seconds, the timer is initialized and reset to 0 seconds. This is not limited herein.

305. If the communication duration is greater than a first time threshold, determine that an exception occurs in the contacts application.

In this embodiment of this application, if the render thread does not receive the receive response within the first time threshold, it indicates that the render thread has an exception. To be specific, it may be understood as that the contacts application has an exception, and no second interface is obtained through refresh on the screen.

306. The exception monitoring system sends an exception message to the exception repair system.

When determining that the contacts application has an exception, the exception monitoring system sends, to the exception repair system, the exception message indicating that the contacts application has an exception. After receiving the exception message, the exception repair system may repair the contacts application.

The exception repair system further determines a repair policy based on detection performed by the exception monitoring system on the display daemon. If it is detected that the display daemon has no exception, step 307 is performed. If it is detected that the display daemon has an exception, the exception repair system restarts the display daemon. After the display daemon is restarted, if the contacts application is still in an exception state, step 307 is performed.

307. The exception repair system restarts the contacts application.

The exception repair system restarts the contacts application. It should be noted that restart herein means closing the contacts application and then restarting the contacts application. In this case, the currently displayed first interface of the contacts application may not be displayed first after the contacts application is restarted, but the initial interface of the contacts application is displayed.

Figure 4:
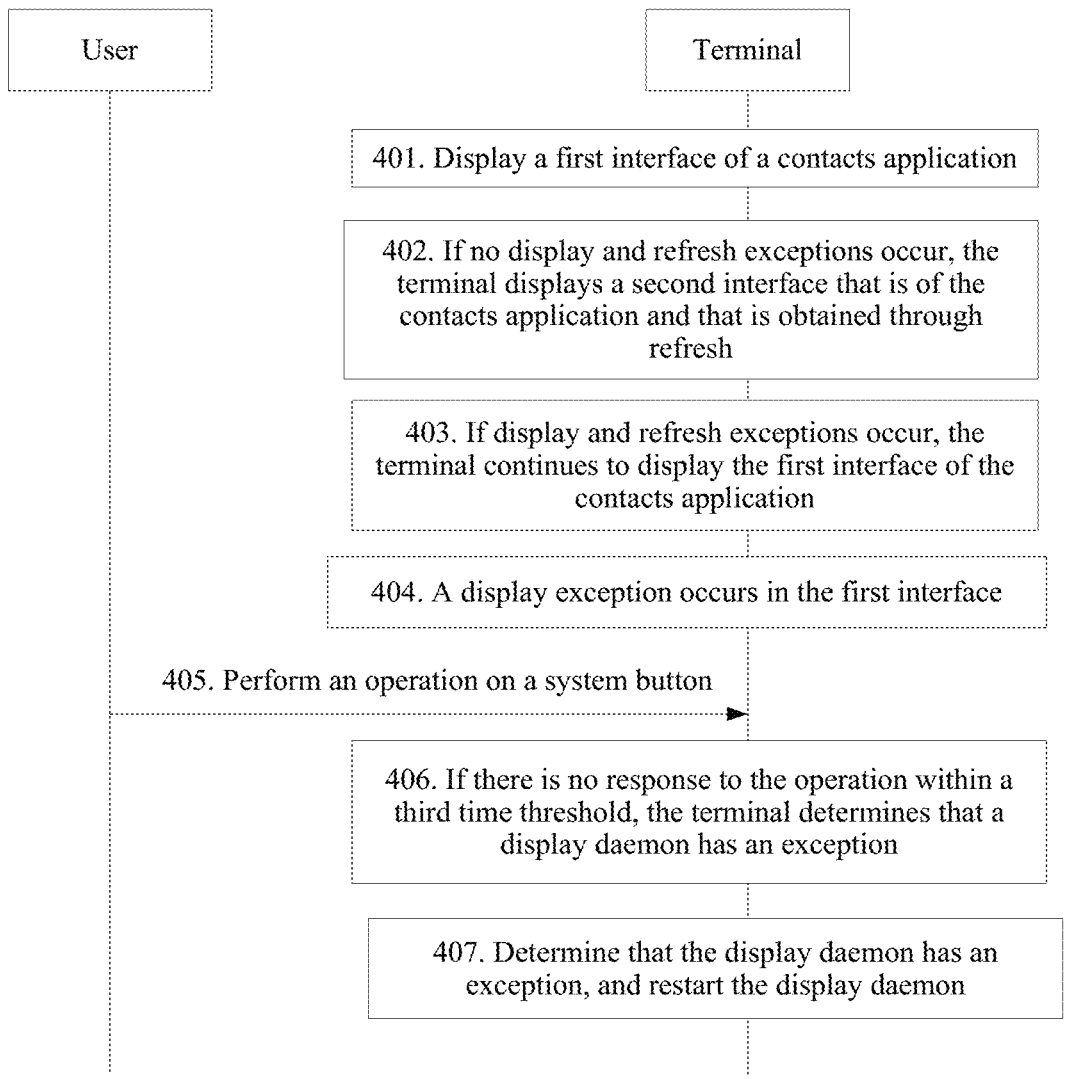
FIG. 4 is a schematic diagram of another embodiment of a method for processing refresh and display exceptions according to an embodiment of this application.

In some feasible embodiments, an exception is not necessarily caused because the application stalls, and may be further caused because the display daemon stalls. The following is described with reference to a specific embodiment. Specifically, FIG. 4 is a schematic diagram of another embodiment of a method for processing refresh and display exceptions according to an embodiment of this application.

401. A terminal displays a first interface of a contacts application.

In this embodiment of this application, a user may perform an operation on the contacts application, for example, tapping, pressing, or double-tapping, to enable a terminal to enter the contacts application and display the first interface of the contacts application.

402. If no display and refresh exceptions occur, the terminal displays a second interface that is of the contacts application and that is obtained through refresh.

This step is the same as step 203, and details are not described herein again.

403. If display and refresh exceptions occur, the terminal continues to display the first interface of the contacts application.

This step is the same as step 204, and details are not described herein again.

404. A display exception occurs in the first interface.

If the first interface cannot be refreshed within specific duration, a crash, stalling, or the like occurs.

405. The terminal receives an operation performed by the user on a system button.

Figure 6H:
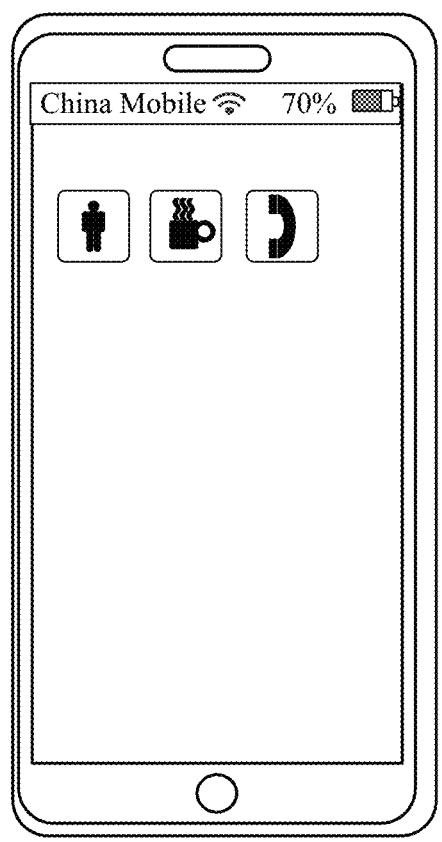
FIG. 6H is a schematic diagram in which a terminal responds to an operation of pressing a home button by a user according to an embodiment of this application.

In some feasible embodiments, the terminal may receive a display interface switching instruction from the user. For example, the terminal receives the operation performed by the user on the system button, for example, receives an operation performed by the user on a volume button, a power button, a home (Home) button, or the like. The terminal may further receive an application switching operation instruction from the user. FIG. 6H is a schematic diagram in which a user taps a home button when there is an exception.

It should be noted that if an exception in the terminal is an exception of the contacts application, the terminal can still respond to the operation performed by the user on the foregoing button; or if an exception in the terminal is an exception of a display daemon, the terminal does not respond to the operation performed on the foregoing button. Therefore, if a display interface does not change after the user taps the volume button, the power button, or the home (Home) button and enters the display interface switching instruction to the terminal through application switching or the like, it indicates that an exception occurs in the display daemon. If the display interface changes, it indicates that no exception occurs in the display daemon.

406. If there is no response to the operation within a third time threshold, the terminal determines that the display daemon has an exception.

Figure 6I:
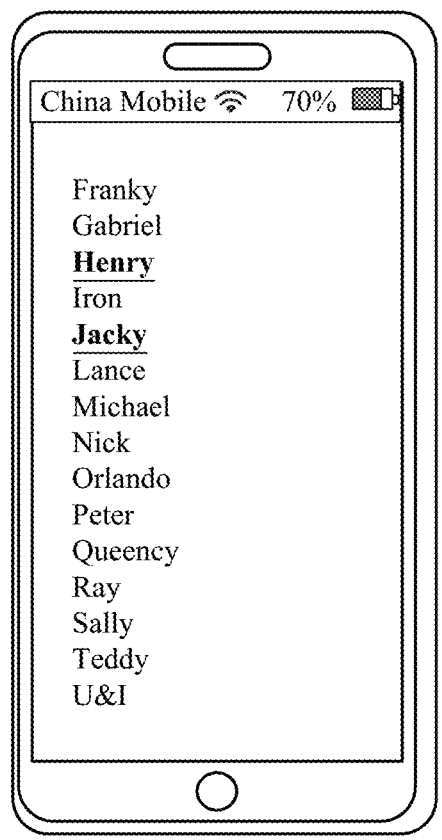
FIG. 6I is a schematic diagram in which a terminal does not respond to an operation of pressing a home button by a user according to an embodiment of this application.

In this embodiment of this application, if the terminal does not respond to the operation performed by the user on the system button, the terminal may determine, within the third time threshold, whether there is an exception. If the third time threshold is exceeded, the terminal determines that the display daemon has an exception, and needs to process the display daemon, for example, may restart the display daemon, to resolve a stalling problem. FIG. 6I is a schematic diagram in which a terminal responds to an operation of pressing a home button by a user.

407. The terminal determines that the display daemon has an exception, and restarts the display daemon.

In this embodiment of this application, when the display daemon is restarted, there may be a black screen for a while, for example, 0.1 second, or there may be no black screen. This is not limited herein. When the display daemon is restarted, an interface existing before the exception occurs is still displayed.

Figure 5:
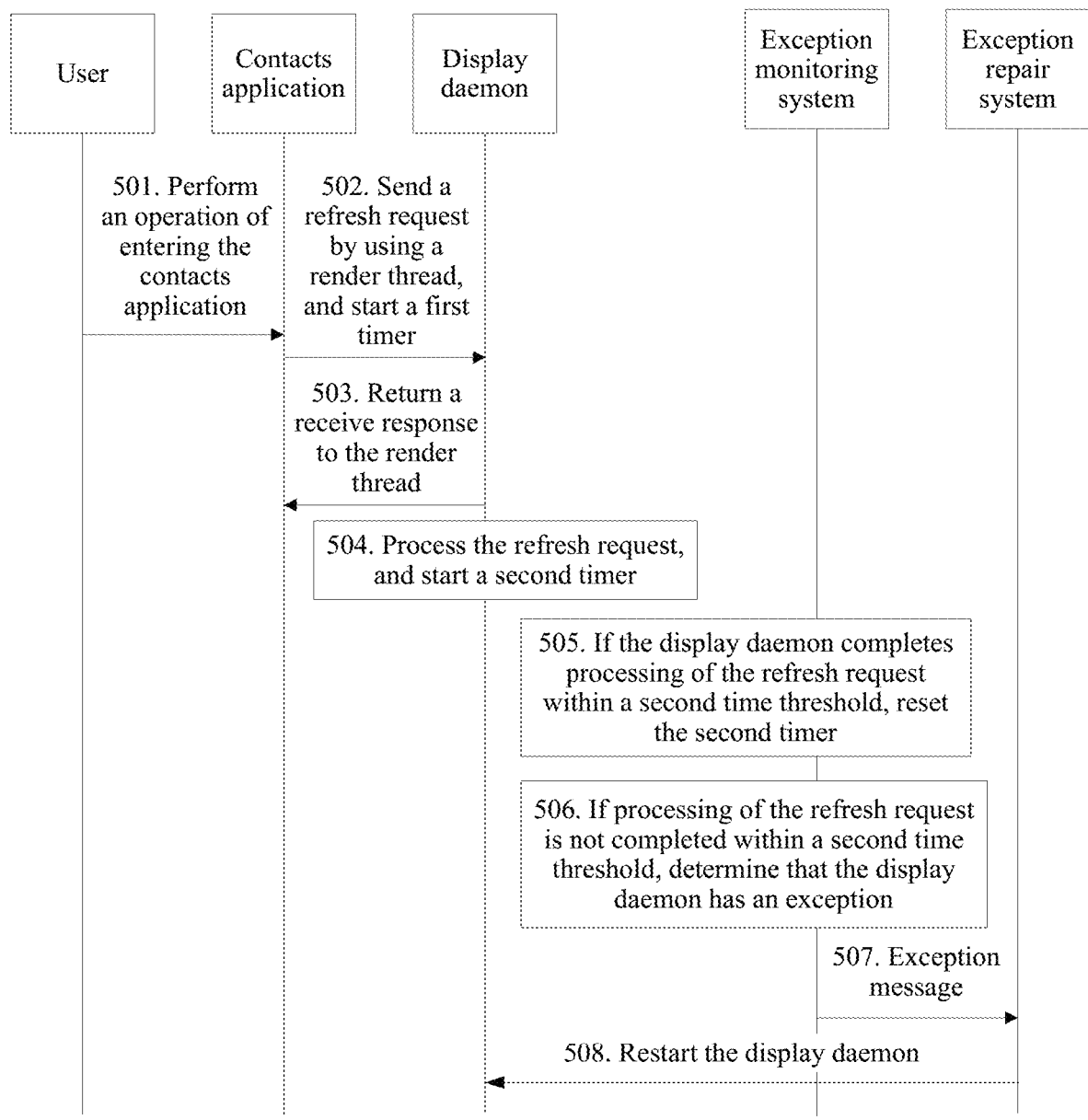
FIG. 5 is a schematic diagram of another embodiment of a method for processing refresh and display exceptions according to an embodiment of this application.

Specifically, FIG. 5 is a schematic diagram of another embodiment of a method for processing refresh and display exceptions according to an embodiment of this application. The following is described with reference to a feature of internal implementation of a terminal.

Steps 501 to 503 are the same as steps 301 to 303 in FIG. 3. Reference may be made to steps 301 to 303 for understanding.

504. The display daemon processes the refresh request, and a second timer is started at the same time.

In this embodiment of this application, when the display daemon starts processing of the refresh request, the second timer is started. The second timer is used to perform timing to determine whether the refresh request can be processed in a timely manner. If the refresh request still cannot be processed within a second time threshold, it may be determined that an exception occurs in the display daemon.

Optionally, in this embodiment of this application, the second timer may be alternatively started when the display daemon receives the refresh request.

505. If the display daemon completes processing of the refresh request within the second time threshold, reset the second timer.

In this embodiment of this application, if the refresh request is processed by the display daemon within the second time threshold, no exception occurs in the display daemon, and the second timer may be reset. A second interface that is of the contacts application and that is obtained through refresh is displayed on the screen.

506. If processing of the refresh request is not completed within the second time threshold, determine that the display daemon has an exception.

In this embodiment of this application, if processing of the refresh request is still not completed within the second time threshold, it is determined that the display daemon has an exception.

507. The exception monitoring system sends an exception message to the exception repair system.

The exception message in this step is used to notify the exception repair system that an exception occurs in the display daemon.

It should be noted herein that regardless of whether the exception monitoring system detects that the render thread has an exception or the display daemon has an exception, the exception monitoring system reports the exception message to the exception repair system. An exception repair process of the render thread has been described in the embodiment corresponding to FIG. 3. In this embodiment, repair of the render thread is not repeatedly described, and only repair of the display daemon is described.

The exception monitoring system may send the exception message to the exception repair system, so that the exception repair system resolves a current exception.

508. The exception repair system restarts the display daemon.

The exception repair system restarts the display daemon. In this embodiment of this application, when the display daemon is restarted, there may be a black screen for a while, for example, 0.1 second, or there may be no black screen. This is not limited herein. When the display daemon is restarted, content existing before the exception occurs is still displayed.

The foregoing embodiments describe exception detection and repair of the render thread and the display daemon in a display and refresh process. The following describes the following case by using an example: Because a message queue of a main thread includes an excessive quantity of messages, a refresh request cannot be processed in a timely manner and a render thread is not called, and consequently stalling is caused.

With reference to the foregoing example of the contacts application, if the render thread of the contacts application is not called, reference may be made to the method shown in FIG. 1E to FIG. 1G, where the refresh request is adjusted to the top of the message queue, so that the refresh request can be processed preferably, thereby resolving a problem that display and refresh of a terminal interface stall.

Figure 7A:
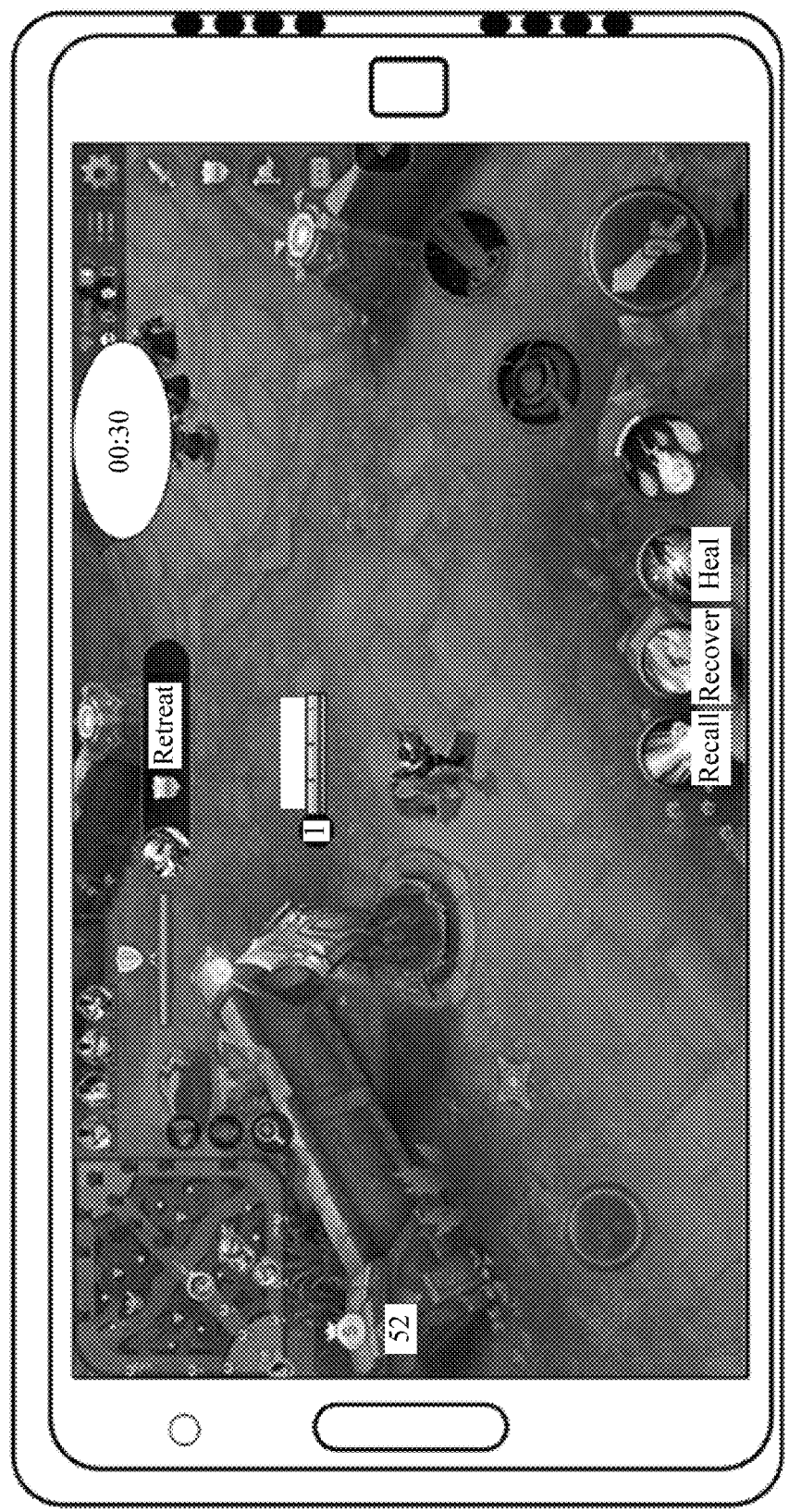
FIG. 7A is a schematic diagram of a game interface that is of a game application and that is displayed on a terminal according to an embodiment of this application.
Figure 7B:
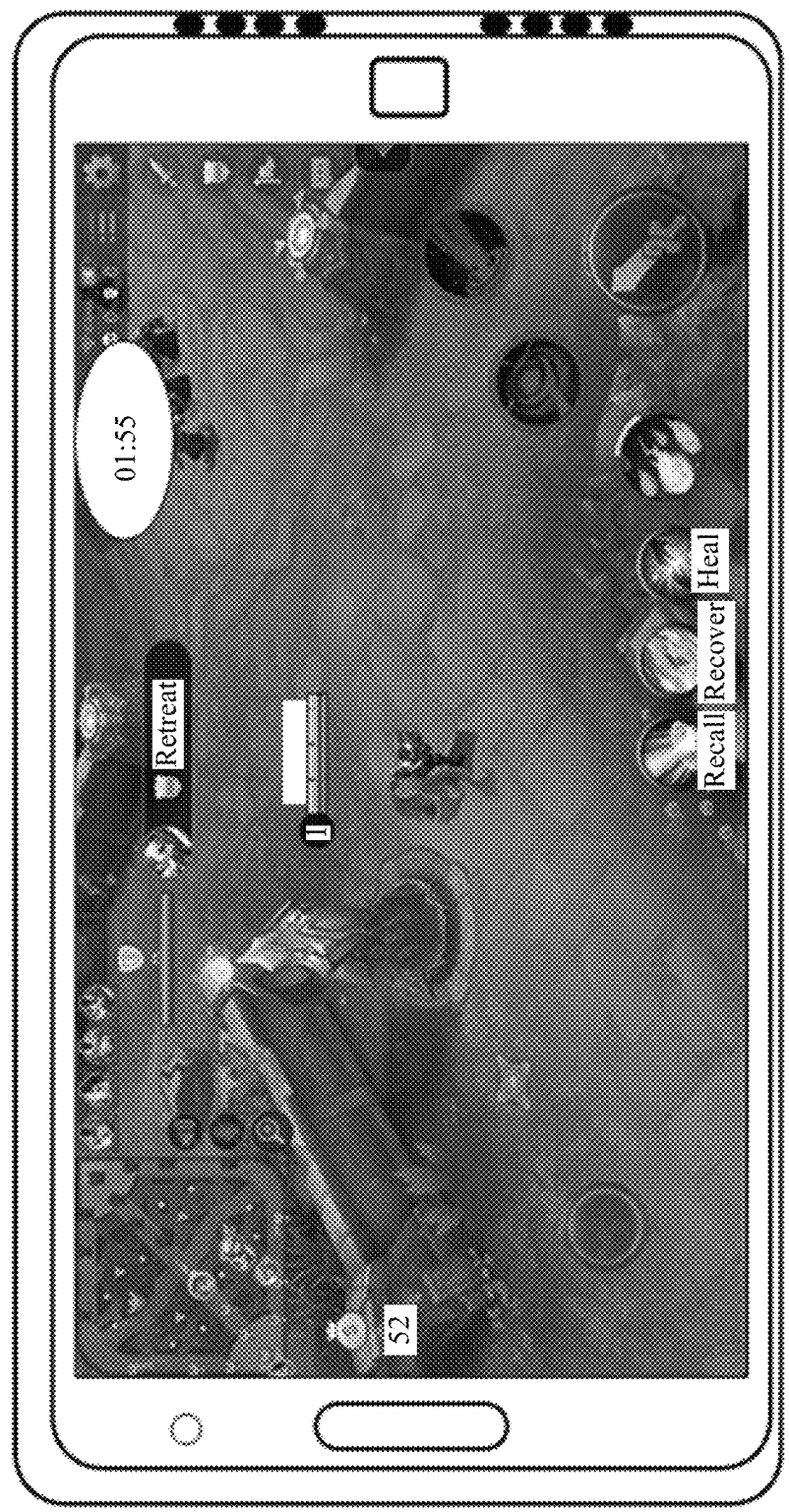
FIG. 7B is a schematic diagram in which a game interface that is of a game application and that is displayed on a terminal stalls according to an embodiment of this application.

In another scenario example, FIG. 7A is a schematic diagram of a game interface that is of a game application and that is displayed on a terminal. As shown in FIG. 7A, a user uses the game application in the terminal to play a large online interactive mobile game in which there are many animation effects and much online interaction, and many people play the mobile game. The game application needs to always interact with a server to process a game effect, and has no time to perform a refresh task. Consequently, the interface of the game application stalls, as shown in FIG. 7B. FIG. 7B is a schematic diagram in which a game interface that is of a game application and that is displayed on a terminal stalls.

In this embodiment of this application, the terminal performs intelligent dynamic allocation based on priorities of tasks of the application, so that the displayed game interface can be normally refreshed even if the game application is in a busy state. For example, in each polling process, the game application searches a message queue of a main thread to determine whether there is a marked refresh request. If there is a marked refresh request, the refresh request is added to a front end of the message queue, where reference may be made to FIG. 1G, so that the main thread preferably processes the refresh request.

Figure 7C:
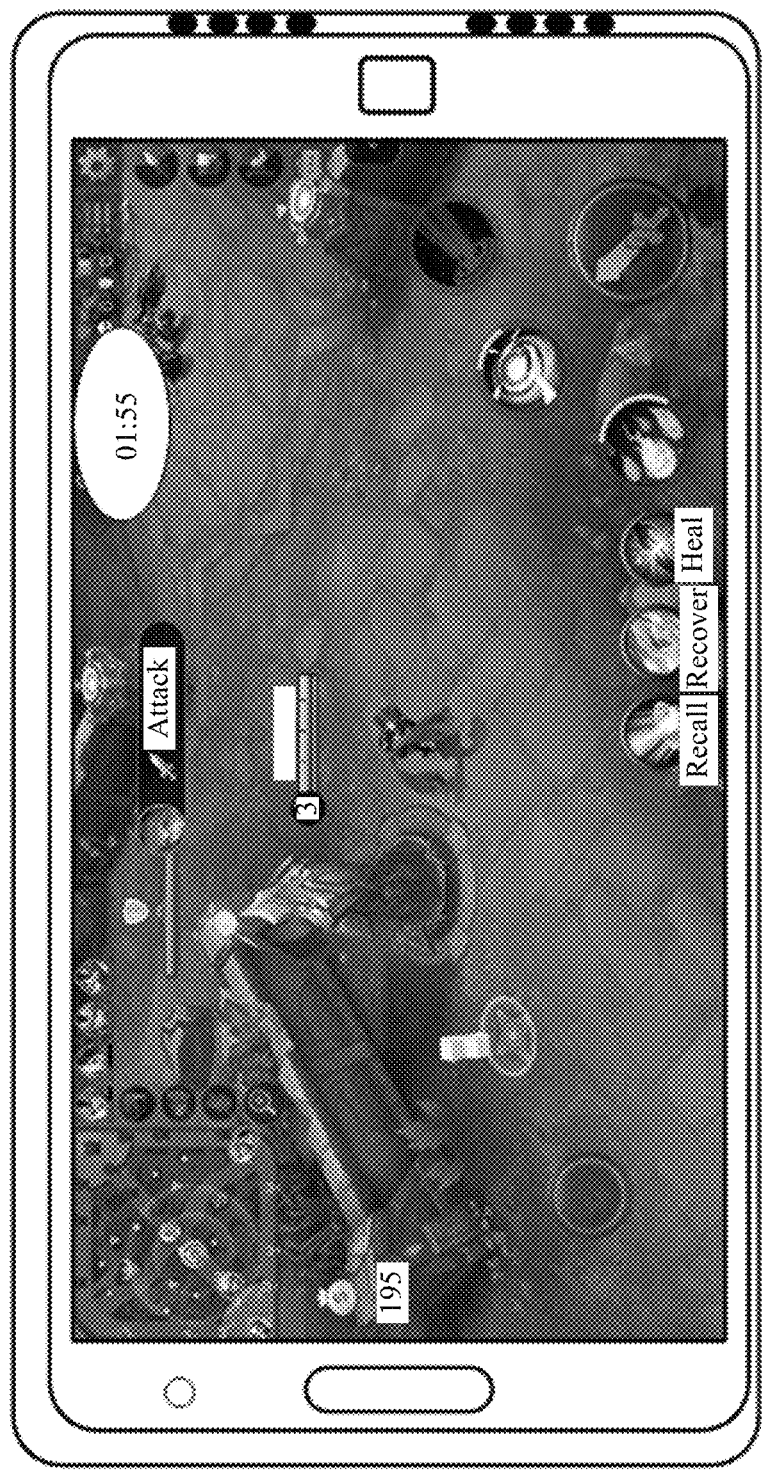
FIG. 7C is a schematic diagram of a refreshed game interface that is of a game application and that is displayed on a terminal according to an embodiment of this application.

FIG. 7C is a schematic diagram of a refreshed game interface that is of a game application and that is displayed on the terminal. As shown in FIG. 7C, an exception repair system of the terminal adds the refresh request to the front end of the queue of the main thread. The main thread may preferably transfer the refresh request to a render thread, the render thread may transfer the refresh request to a display daemon, and the display daemon performs image composition, so that the refreshed game interface can be displayed on a screen of the terminal.

In this embodiment of this application, when the large online game (or a multi-user online chat application) is played, for a stalling problem caused by busy tasks, the terminal may intelligently adjust the priorities of the tasks, so that screen refresh is always fluent. To be specific, a display stalling detection algorithm and a display stalling repair algorithm are added, so that processing of the tasks of the application in the terminal is intelligently scheduled, the refresh request is processed preferably, a problem that screen refresh of the terminal stalls or a frame is lost due to the busy tasks is identified, and automatic detection and automatic repair are performed.

It should be noted that only the game application is used as an example for description herein. In any other application, if to-be-processed task requests include a refresh request, the refresh request may be adjusted to the top of a message queue of a main thread, to be processed preferably.

In addition, optionally, in infringement detection, an example command used to simulate a crash of a render thread of an application or a crash of a display daemon is as follows:

Fault injection command: rProcess fault=hang pid=xxx
Fault injection: linux-39:/home/y1/work/2016/5/process #./rProcess fault=hang tid=3960
successful execution [rProcess fault=hang tid=3960]
Injection effect:
linux-39:/home/y1/work/2016/5/process #.cat/proc/3960/status|grep St
State: T (stopped)
VmStk: 136 kB The foregoing describes the process of detecting and repairing refresh and display exceptions. With reference to the accompanying drawings, the following describes a terminal for performing the foregoing method embodiments.

Figure 8:
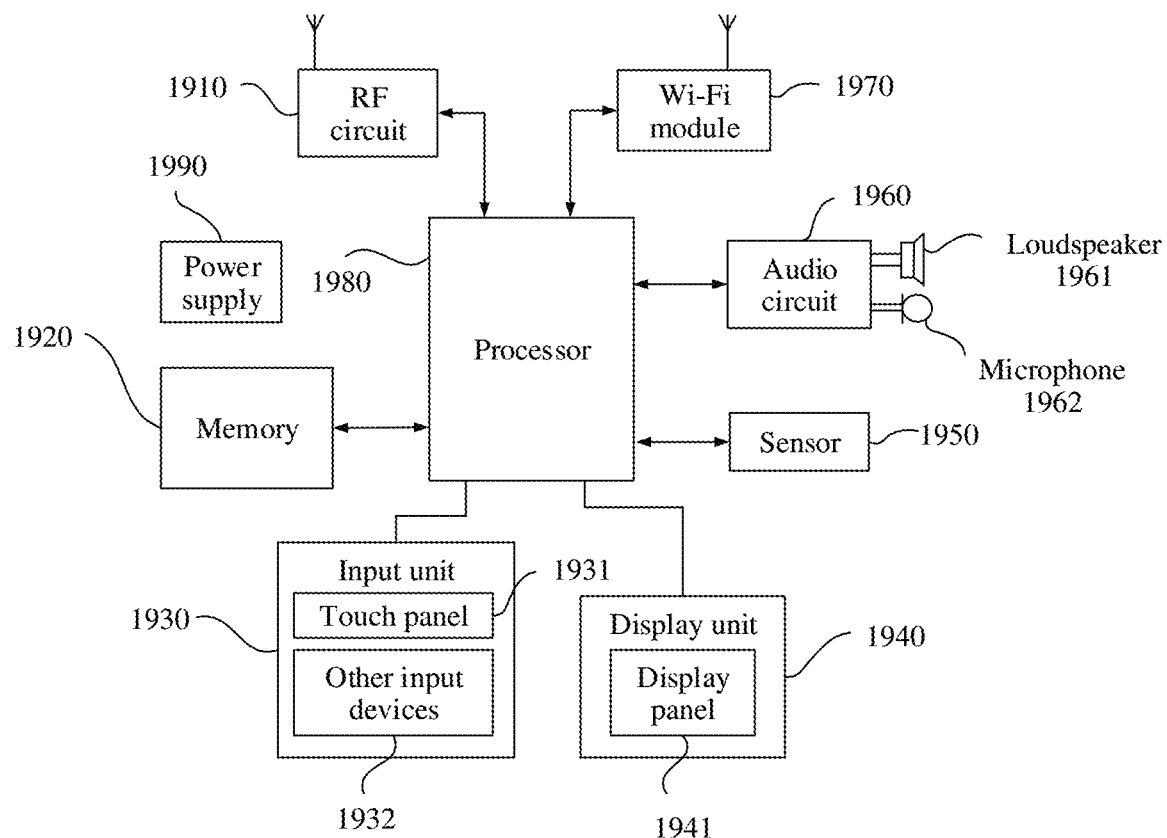
FIG. 8 is a schematic diagram of an embodiment of a terminal according to an embodiment of this application.

In this embodiment of this application, an example in which a mobile terminal is a mobile phone is used to describe a process of processing refresh and display exceptions provided in this application. The following specifically describes components of the mobile phone with reference to FIG. 8. FIG. 8 is a block diagram of a partial structure of a mobile phone related to a terminal according to an embodiment of this application. Referring to FIG. 8, the mobile phone includes components such as an input unit 1930, a display unit 1940, a processor 1980, a radio frequency (Radio Frequency, RF) circuit 1910, a memory 1920, a sensor 1950, an audio circuit 1960, a wireless fidelity (wireless fidelity, WiFi) module 1970, and a power supply 1990. A person skilled in the art may understand that a structure of the mobile phone shown in FIG. 8 does not constitute a limitation on the mobile phone, and the mobile phone may include more or fewer components than those shown in the figure, combine some components, or have different component arrangements.

The following specifically describes the components of the mobile phone with reference to FIG. 8.

The display unit 1940 may be configured to display information entered by a user or information provided for a user, and various menus of the mobile phone. In this embodiment of this application, the display unit 1940 is configured to display data of an application.

The display unit 1940 may include a display panel 1941. Optionally, the display panel 1941 may be configured in a form of a liquid crystal display (Liquid Crystal Display, LCD), an organic light-emitting diode (Organic Light-Emitting Diode, OLED), or the like. Further, a touch panel 1931 may cover the display panel 1941. After detecting a touch operation on or near the touch panel 1931, the touch panel 1931 transfers the touch operation to the processor 1980, to determine a type of a touch event. Subsequently, the processor 1980 provides a corresponding visual output on the display panel 1941 based on the type of the touch event. In FIG. 8, the touch panel 1931 and the display panel 1941 are used as two independent components to implement input and input functions of the mobile phone. However, in some embodiments, the touch panel 1931 and the display panel 1941 may be integrated to implement the input and output functions of the mobile phone.

The input unit 1930 may be configured to receive entered digital or character information, and generate a key signal input related to user settings and function control of the mobile phone. In this embodiment of this application, the input unit 1930 is configured to receive an operation that is input by the user. Specifically, the input unit 1930 may include the touch panel 1931 and other input devices 1932. The touch panel 1931, also referred to as a touchscreen, may collect a touch operation performed by the user on or near the touch panel 1931 (for example, an operation performed by the user on the touch panel 1931 or near the touch panel 1931 by using any suitable object or accessory such as a finger or a stylus), and may drive a corresponding connection apparatus according to a preset program. Optionally, the touch panel 1931 may include two parts: a touch detection apparatus and a touch controller. The touch detection apparatus detects a touch position of the user, detects a signal brought by a touch operation, and delivers the signal to the touch controller. The touch controller receives touch information from the touch detection apparatus, converts the touch information into coordinates of a touch point, and sends the coordinates of the touch point to the processor 1980. In addition, the touch controller can receive and execute a command sent by the processor 1980. In addition, the touch panel 1931 may be implemented in a plurality of types, such as a resistive type, a capacitive type, an infrared type, and a surface acoustic wave type. In addition to the touch panel 1931, the input unit 1930 may further include other input devices 1932. Specifically, the other input devices 1932 may include but are not limited to one or more of a physical keyboard, a function button (for example, a volume control key or an on/off key), a trackball, a mouse, and a joystick.

The processor 1980 is a control center of the mobile phone, connects various parts of the entire mobile phone by using various interfaces and lines, and performs various functions of the mobile phone and processes data by running or executing a software program and/or a module that are/is stored in the memory 1920 and by invoking data stored in the memory 1920, to perform overall monitoring of the mobile phone. Optionally, the processor 1980 may include one or more processing units. Preferably, an application processor and a modem processor may be integrated into the processor 1980. The application processor mainly processes an operating system, a user interface, an application program, and the like. The modem processor mainly processes wireless communication. It may be understood that the modem processor may not be integrated into the processor 1980.

The memory 1920 may be configured to store a software program and a module. The processor 1980 performs various function applications of the mobile phone and processes data by running the software program and the module that are stored in the memory 1920. The memory 1920 may mainly include a program storage area and a data storage area. The program storage area may store an operating system, an application program required by at least one function (for example, a sound play function and an image play function), and the like. The data storage area may store data (for example, audio data and a phone book) created based on use of the mobile phone, and the like. In addition, the memory 1920 may include a high-speed random access memory, and may further include a nonvolatile memory, for example, at least one magnetic disk storage device, a flash memory device, or another volatile solid-state storage device.

The mobile phone may further include at least one sensor 1950 such as a light sensor, a motion sensor, and another sensor. Specifically, the light sensor may include an ambient light sensor and a proximity sensor. The ambient light sensor may adjust luminance of the display panel 1941 based on brightness of ambient light. The proximity sensor may turn off the display panel 1941 and/or backlight when the mobile phone moves to an ear of the user. As a type of motion sensor, an accelerometer sensor may detect a value of an acceleration in each direction (generally, three axes), may detect a value and a direction of gravity in a static state, and may be used in an application for identifying a mobile phone posture (for example, screen switching between a landscape mode and a portrait mode, a related game, or magnetometer posture calibration), a function related to vibration identification (for example, a pedometer or a knock), and the like. Other sensors such as a gyroscope, a barometer, a hygrometer, a thermometer, and an infrared sensor may be further disposed in the mobile phone. Details are not described herein.

The audio circuit 1960, a loudspeaker 1961, and a microphone 1962 may provide an audio interface between the user and the mobile phone. The audio circuit 1960 may convert received audio data into an electrical signal, and then transmit the electrical signal to the loudspeaker 1961, and the loudspeaker 1961 converts the electrical signal into a sound signal for output. In addition, the microphone 1962 converts a collected sound signal into an electrical signal. The audio circuit 1960 receives the electrical signal, converts the electrical signal into audio data, and then outputs the audio data to the processor 1980 for processing. After the processing, the processor 1980 sends the audio data to, for example, another mobile phone, by using the RF circuit 1910, or outputs the audio data to the memory 1920 for further processing.

The RF circuit 1910 may be configured to receive/send a signal in an information receiving/sending process or a call process. In particular, after receiving downlink information of a base station, the RF circuit 1910 sends the downlink information to the processor 1980 for processing, and sends designed uplink data to the base station. Generally, the RF circuit 1910 includes but is not limited to an antenna, at least one amplifier, a transceiver, a coupler, a low noise amplifier (Low Noise Amplifier, LNA), a duplexer, and the like. In addition, the RF circuit 1910 may further communicate with a network and another device through wireless communication. Any communication standard or protocol may be used for the wireless communication, including but not limited to a global system for mobile communications (Global System for Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

Wi-Fi is a short-range wireless transmission technology. The mobile phone may help, by using the Wi-Fi module 1970, the user receive and send an email, browse a web page, access streaming media, and the like. The Wi-Fi module 1970 provides wireless broadband Internet access for the user. Although FIG. 8 shows the Wi-Fi module 1970, it may be understood that the Wi-Fi module 1970 is not a mandatory component of the mobile phone, and may be omitted as required without changing the essence of the present invention.

The mobile phone further includes the power supply 1990 (for example, a battery) supplying power to each component. Preferably, the power supply may be logically connected to the processor 1980 by using a power management system, to implement functions such as charging, discharging, and power consumption management by using the power management system.

Although not shown, the mobile phone may further include a camera, a Bluetooth module, and the like. Details are not described herein.

When the mobile phone provided in this embodiment of this application performs the process of processing refresh and display exceptions, the processor 1980 performs the following steps:

obtaining a refresh request of an application, where the refresh request is used to instruct to refresh display data of the application;

transferring the refresh request to a display daemon by using a render thread of the application;

when communication duration between the render thread and the display daemon is greater than a first time threshold, determining that an exception occurs in the render thread; and when duration in which the display daemon processes the refresh request is greater than a second time threshold, determining that an exception occurs in the display daemon.

Optionally, in some embodiments of this application, the processor 1980 is further configured to: when an exception occurs in either the render thread or the display daemon, repair the render thread or the display daemon by using a corresponding repair policy.

Optionally, in some embodiments of this application, the processor 1980 is further configured to: start timing when the render thread transfers the refresh request to the display daemon; and determine, as the communication duration, duration from a moment at which the render thread transfers the refresh request to the display daemon to a moment at which the render thread receives a receive response returned by the display daemon, where the receive response is a response indicating that the display daemon receives the refresh request.

Optionally, in some embodiments of this application, the processor 1980 is further configured to: start timing when the render thread transfers the refresh request to the display daemon; and if the render thread has not received a receive response when the timing exceeds the first time threshold, determine that the communication duration between the render thread and the display daemon is greater than the first time threshold, where the receive response is a response indicating that the display daemon receives the refresh request.

Optionally, in some embodiments of this application, the processor 1980 is further configured to: start timing when the display daemon starts processing of the refresh request, and end timing when the display daemon ends processing of the refresh request; and determine duration from a timing start moment to a timing end moment as the processing duration.

Optionally, in some embodiments of this application, the processor 1980 is further configured to: start timing when the display daemon starts processing of the refresh request; and if the display daemon has not ended processing of the refresh request when the timing exceeds the second time threshold, determine that the duration in which the display daemon processes the refresh request is greater than the second time threshold.

Optionally, in some embodiments of this application, the processor 1980 is specifically configured to: when an exception occurs in the render thread, restart the application.

Optionally, in some embodiments of this application, the processor 1980 is further configured to: if the render thread is not called, detect a message queue of the application; and if it is detected that the message queue includes a refresh request that is in a wait state and that is related to display, adjust the refresh request in the wait state in the message queue to the top of the message queue, so that the refresh request in the wait state is processed preferably.

Optionally, in some embodiments of this application, the processor 1980 is specifically configured to: when an exception occurs in the display daemon, restart the display daemon.

Optionally, in some embodiments of this application, the processor 1980 is further configured to: respond to an entered display interface switching instruction, where the display interface switching instruction is used to instruct to switch a display interface; and if it is detected that the display interface is not switched, determine that an exception occurs in the display daemon, and restart the display daemon.

Figure 9:
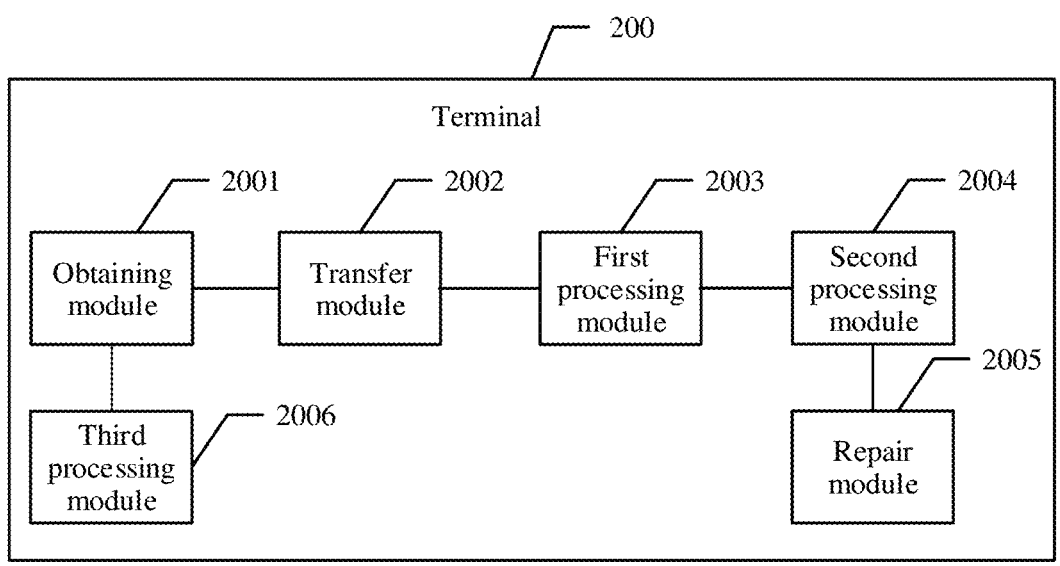
FIG. 9 is a schematic diagram of another embodiment of a terminal according to an embodiment of this application.

Referring to FIG. 9, another embodiment of a terminal according to an embodiment of this application includes:

an obtaining module 2001, configured to obtain a refresh request of an application, where the refresh request is used to instruct to refresh display data of the application;

a transfer module 2002, configured to transfer the refresh request, obtained by the obtaining module, to a display daemon by using a render thread of the application;

a first processing module 2003, configured to: when communication duration between the render thread and the display daemon is greater than a first time threshold, determine that an exception occurs in the render thread; and a second processing module 2004, configured to: when duration in which the display daemon processes the refresh request is greater than a second time threshold, determine that an exception occurs in the display daemon.

Optionally, a repair module 2005 is configured to: when an exception occurs in either the render thread or the display daemon, repair the render thread or the display daemon by using a corresponding repair policy.

Optionally, the first processing module 2003 is further configured to:

start timing when the render thread transfers the refresh request to the display daemon; and determine, as the communication duration, duration from a moment at which the render thread transfers the refresh request to the display daemon to a moment at which the render thread receives a receive response returned by the display daemon, where the receive response is a response indicating that the display daemon receives the refresh request.

Optionally, the first processing module 2003 is further configured to:

start timing when the render thread transfers the refresh request to the display daemon; and if the render thread has not received a receive response when the timing exceeds the first time threshold, determine that the communication duration between the render thread and the display daemon is greater than the first time threshold, where the receive response is a response indicating that the display daemon receives the refresh request.

Optionally, the second processing module 2004 is further configured to:

start timing when the display daemon starts processing of the refresh request, and end timing when the display daemon ends processing of the refresh request; and determine duration from a timing start moment to a timing end moment as the processing duration.

Optionally, the second processing module 2004 is further configured to:

start timing when the display daemon starts processing of the refresh request; and if the display daemon has not ended processing of the refresh request when the timing exceeds the second time threshold, determine that the duration in which the display daemon processes the refresh request is greater than the second time threshold.

Optionally, the repair module 2005 is specifically configured to:

when an exception occurs in the render thread, restart the application.

Optionally, the repair module 2005 is further specifically configured to:

if the render thread is not called, detect a message queue of the application; and if it is detected that the message queue includes a refresh request that is in a wait state and that is related to display, adjust the refresh request in the wait state in the message queue to the top of the message queue, so that the refresh request in the wait state is processed preferably.

Optionally, the repair module 2005 is specifically configured to:

when an exception occurs in the display daemon, restart the display daemon.

Optionally, the terminal further includes a third processing module 2006;

the obtaining module 2001 is further configured to respond to an entered display interface switching instruction, where the display interface switching instruction is used to instruct to switch a display interface; and the third processing module 2006 is configured to: if it is detected that the display interface is not switched, determine that an exception occurs in the display daemon, and restart the display daemon.

All or some of the foregoing embodiments may be implemented by using software, hardware, firmware, or any combination thereof. When software is used to implement the embodiments, the embodiments may be totally or partially implemented in a form of a computer program product.

The computer program product includes one or more computer instructions. When the computer program instructions are loaded and executed on a computer, the procedure or functions according to the embodiments of the present invention are totally or partially generated. The computer may be a general-purpose computer, a special-purpose computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

A person of ordinary skill in the art may understand that all or some of the steps of the methods in the foregoing embodiments may be completed by a program instructing related hardware. The program may be stored in a computer readable storage medium. The storage medium may include a ROM, a RAM, a magnetic disk, an optical disc, or the like.

The foregoing describes in detail the method for processing refresh and display exceptions and the terminal that are provided in the embodiments of the present invention. In this specification, specific examples are used to describe the principles and implementations of the present invention. The descriptions of the foregoing embodiments are merely intended to help understand the method and core ideas of the present invention. In addition, a person of ordinary skill in the art can make modifications to specific implementations and application scopes based on the ideas of the present invention. In conclusion, the content of this specification shall not be construed as a limitation on the present invention.

What is claimed is:

1. A method, comprising:
   obtaining a display refresh request of an application, wherein the refresh request instructs a terminal to refresh display data of the application;
   transferring the refresh request to a display daemon in the terminal using a render thread of the application in the terminal;
   in response to a communication duration between the render thread and the display daemon in the terminal being greater than a first time threshold, determining that an exception occurs in the render thread of the application in the terminal; and
   in response to a processing duration in which the display daemon in the terminal processes the refresh request being greater than a second time threshold, determining that an exception occurs in the display daemon of the terminal.

2. The method according to claim 1, further comprising:
   repairing, using a first repair policy, the render thread in response to the exception occurring in the render thread; or
   repairing, using a second repair policy, the display daemon when the exception occurs in the display daemon.

3. The method according to claim 2, wherein repairing, using the first repair policy, the render thread when the exception occurs in the render thread comprises:
   when the exception occurs in the render thread, restarting the application.

4. The method according to claim 3, further comprising:
   in response to determining that the render thread has not been called, detecting a message queue of the application; and
   in response to detecting that the message queue comprises a refresh request that is in a wait state and that is related to display, adjusting the refresh request in the wait state in the message queue to the top of the message queue, causing the refresh request in the wait state to be preferably processed.

5. The method according to claim 2, wherein repairing, using the second repair policy, the display daemon when the exception occurs in the display daemon comprises:
   when the exception occurs in the display daemon, restarting the display daemon.

6. The method according to claim 1, further comprising:
   starting to time when the refresh request is transferred to the display daemon using the render thread; and
   determining, as the communication duration, a duration from a moment at which the refresh request is transferred to the display daemon using the render thread to a moment at which the render thread receives a receive response returned by the display daemon, wherein the receive response indicates that the display daemon has received the refresh request.

7. The method according to claim 1, further comprising:
   starting to time when the refresh request is transferred to the display daemon using the render thread; and
   in response to the render thread not receiving a receive response when a timing duration exceeds the first time threshold, determining that the communication duration is greater than the first time threshold, wherein the receive response indicates that the display daemon has received the refresh request.

8. The method according to claim 1, further comprising:
   starting to time when the display daemon starts to process the refresh request, and ending timing when the display daemon ends processing of the refresh request; and
   determining a duration from a timing start moment to a timing end moment as the processing duration.

9. The method according to claim 1, further comprising:
   starting to time when the display daemon starts to process the refresh request; and in response to the display daemon not ending processing of the refresh request when the timing exceeds the second time threshold, determining that the processing duration in which the display daemon processes the refresh request is greater than the second time threshold.

10. The method according to claim 1, wherein after obtaining the refresh request of the application, the method further comprises:
responding to an entered display interface switching instruction, wherein the display interface switching instruction instructs to switch a display interface; and
in response to detecting that the display interface is not switched, determining that the exception occurs in the display daemon, and restarting the display daemon.

11. A terminal, comprising:
a touchscreen, comprising a touch-sensitive surface and a display;
one or more processors;
a non-transitory memory; and
a plurality of application programs and one or more computer programs, wherein the one or more computer programs are stored in the non-transitory memory, the one or more computer programs comprise an instruction, and when the instruction is executed by the terminal, the terminal is caused to:
obtain a display refresh request of an application, wherein the refresh request instructs a terminal to refresh display data of the application;
transfer the refresh request to a display daemon in the terminal using a render thread of the application in the terminal;
determine, according to a communication duration between the render thread and the display daemon being greater than a first time threshold, that an exception occurs in the render thread of the application in the terminal; and
determine, according to a processing duration in which the display daemon in the terminal processes the refresh request being greater than a second time threshold, that an exception occurs in the display daemon of the terminal.

12. The terminal according to claim 11, wherein when the instruction is executed by the terminal, the terminal is further caused to:
when an exception occurs in the render thread, repair the render thread using a first repair policy; or
when an exception occurs in the display daemon, repair the display daemon using a second repair policy.

13. The terminal according to claim 12, wherein when the instruction is executed by the terminal, the terminal is further caused to:
when an exception occurs in the render thread, restart the application.

14. The terminal according to claim 13, wherein when the instruction is executed by the terminal, the terminal is caused to:
in response to the render thread not being called, detect a message queue of the application; and
in response to detecting that the message queue comprises a refresh request that is in a wait state and that is related to display, adjust the refresh request in the wait state in the message queue to the top of the message queue, causing the refresh request in the wait state to be preferably processed.

15. The terminal according to claim 13, wherein when the instruction is executed by the terminal, the terminal is caused to:
when an exception occurs in the display daemon, restart the display daemon.

16. The terminal according to claim 11, wherein when the instruction is executed by the terminal, the terminal is further caused to:
start to time when the refresh request is transferred to the display daemon using the render thread; and
determine, as the communication duration, a duration from a moment at which the refresh request is transferred to the display daemon using the render thread to a moment at which the render thread receives a receive response returned by the display daemon, wherein the receive response indicates that the display daemon receives the refresh request.

17. The terminal according to claim 11, wherein when the instruction is executed by the terminal, the terminal is further caused to:
start to time when the refresh request is transferred to the display daemon using the render thread; and
in response to the render thread not receiving a receive response when the timing duration exceeds the first time threshold, determine that the communication duration is greater than the first time threshold, wherein the receive response indicates that the display daemon receives the refresh request.

18. The terminal according to claim 11, wherein when the instruction is executed by the terminal, the terminal is further caused to:
start to time when the display daemon starts to process the refresh request, and end the timing when the display daemon ends processing the refresh request; and
determine a duration from a timing start moment to a timing end moment as the processing duration.

19. The terminal according to claim 11, wherein when the instruction is executed by the terminal, the terminal is further caused to:
start to time when the display daemon starts to process the refresh request; and
in to response to the display daemon not ending processing of the refresh request when the timing exceeds the second time threshold, determine that the processing duration in which the display daemon processes the refresh request is greater than the second time threshold.

20. The terminal according to claim 11, wherein when the instruction is executed by the terminal, the terminal is further caused to:
after obtaining the refresh request of the application, respond to an entered display interface switching instruction, wherein the display interface switching instruction instructs to switch a display interface; and
in response to detecting that the display interface has not been switched, determine that an exception has occurred in the display daemon, and restart the display daemon.

* * * * *